US009909238B2

(12) United States Patent
Wolf et al.

(10) Patent No.: US 9,909,238 B2
(45) Date of Patent: Mar. 6, 2018

(54) MONITORING DEVICE FOR A WEAVING MACHINE, WEAVING MACHINE, AND METHOD FOR MONITORING

(71) Applicant: Staubli Sargans AG, Sargans (CH)

(72) Inventors: Markus Wolf, Schaan (LI); Armin Ackermann, Mels (CH)

(73) Assignee: STAUBLI SARGANS AG, Sargans (CH)

( * ) Notice: Subject to any disclaimer, the term of this patent is extended or adjusted under 35 U.S.C. 154(b) by 6 days.

(21) Appl. No.: 14/907,871

(22) PCT Filed: Jul. 23, 2014

(86) PCT No.: PCT/CH2014/000113
§ 371 (c)(1),
(2) Date: Jan. 27, 2016

(87) PCT Pub. No.: WO2015/013831
PCT Pub. Date: Feb. 5, 2015

(65) Prior Publication Data
US 2016/0177481 A1 Jun. 23, 2016

(30) Foreign Application Priority Data

Jul. 30, 2013 (EP) .................................... 13405098

(51) Int. Cl.
*G06F 19/00* (2011.01)
*D03J 1/00* (2006.01)
(Continued)

(52) U.S. Cl.
CPC .............. *D03J 1/005* (2013.01); *D03D 49/00* (2013.01); *D03D 49/62* (2013.01); *D03D 51/00* (2013.01);
(Continued)

(58) Field of Classification Search
CPC .. D03J 1/005; D03J 1/007; D03J 1/24; D03D 51/00; D03D 51/18; D03D 51/20;
(Continued)

(56) References Cited

U.S. PATENT DOCUMENTS 4,582,095 A   4/1986  Kronholm
5,165,454 A * 11/1992 Kanayama ............. D03D 51/28
                                                139/351
(Continued)

FOREIGN PATENT DOCUMENTS

DE   34 35 391 A1   4/1985
FR   2 785 628 A1   5/2000
(Continued)

OTHER PUBLICATIONS

International Search Report for PCT/CH2014/000113 dated Oct. 2, 2014.

*Primary Examiner* — Nathan Durham
(74) *Attorney, Agent, or Firm* — Pearne & Gordon LLP

(57) ABSTRACT

The monitoring device for a weaving machine includes at least one camera and a weft-thread beat-up device. The weft-thread beat-up device includes at least one reed and/or a batten and the reed and/or the batten extends in a longitudinal direction of the weft-thread beat-up device. The at least one camera apparatus is fastened to the weft-thread beat-up device and includes sensor elements arranged adjacent to one another. The camera is designed to record an image using the sensor elements, wherein the sensor elements are arranged in a row that extends substantially parallel to the longitudinal direction of the weft-thread beat-up device.

17 Claims, 8 Drawing Sheets

(51) Int. Cl.
| | |
|---|---|
| *D03D 49/62* | (2006.01) |
| *D03D 51/20* | (2006.01) |
| *D03D 51/34* | (2006.01) |
| *D03D 49/00* | (2006.01) |
| *D03D 51/00* | (2006.01) |
| *D03J 1/24* | (2006.01) |
| *G06T 7/00* | (2017.01) |
| *H04N 5/225* | (2006.01) |
| *H04N 5/232* | (2006.01) |
| *H04N 5/247* | (2006.01) |
| *H04N 5/77* | (2006.01) |
| *H04N 7/18* | (2006.01) |

(52) U.S. Cl.
CPC ............ *D03D 51/20* (2013.01); *D03D 51/34* (2013.01); *D03J 1/007* (2013.01); *D03J 1/24* (2013.01); *G06T 7/0008* (2013.01); *H04N 5/2253* (2013.01); *H04N 5/23203* (2013.01); *H04N 5/247* (2013.01); *H04N 5/77* (2013.01); *H04N 7/181* (2013.01); *G06T 2207/30124* (2013.01)

(58) Field of Classification Search
CPC ........ D03D 51/28; D03D 51/32; D03D 51/40; D03D 49/62
USPC ........................................................ 700/140
See application file for complete search history.

(56) References Cited

U.S. PATENT DOCUMENTS

| | | | | |
|---|---|---|---|---|
| 5,271,345 | A | * 12/1993 | Matschulat | ............ D05B 19/00 112/306 |
| 6,950,717 | B1 | * 9/2005 | Pierce | .................... D06C 21/00 26/74 |
| 7,310,565 | B2 | * 12/2007 | Vergote | .................. D03D 51/18 139/318 |
| 2006/0015209 | A1 | * 1/2006 | Schweizer | ............ D05B 19/02 700/136 |

FOREIGN PATENT DOCUMENTS

| | | |
|---|---|---|
| JP | 03-241043 A | 10/1991 |
| JP | 04-241148 A | 8/1992 |
| JP | 04-241149 A | 8/1992 |
| JP | 08-209501 A | 8/1996 |
| JP | 08-302535 A | 11/1996 |
| WO | 2006/117673 A1 | 11/2006 |

* cited by examiner

MONITORING DEVICE FOR A WEAVING MACHINE, WEAVING MACHINE, AND METHOD FOR MONITORING

The invention relates to a monitoring device for a weaving machine. The invention further relates to a weaving machine with a monitoring device. Finally the invention relates to a method for monitoring the warp threads of a weaving machine.

In order to produce woven materials, nowadays automatic weaving machines are usually used. Such weaving machines exist in various embodiments. A main difference consists, for example, in the way in which the weft thread is guided through the shed. Here, for example, weaving machines are known which shoot the weft thread through the shed with the aid of a flying shuttle. Weaving machines are also known in which the weft thread is moved through the shed by means of a gripper device. Recently, weaving machines in which the weft thread is shot through the shed by means of compressed air have also been successfully used.

Regardless of how the specific design appears, present-day weaving machines are as far as possible automated and the continuous monitoring by a machine operator or interventions of a machine operator are severely reduced over the longest possible time intervals.

Poor thread quality, poor weaving preparation quality, non-optimized control of the weaving machine, incorrect operation are several reasons which result in certain disturbances in the weaving process. For example, adjacent warp threads can easily become entangled with one another so that for example, a correctly opened shed does not occur or for example, warp thread breaks occur. For example after stopping the machine on account of a warp thread break, the operator can knot two thread ends which do not come from the same thread. This usually results in defects in the material produced (designated as weaving defects in technical terminology), which in the most favourable case are visually disturbing and in the most unfavourable case result in the material being unusable. Since materials today are sold in larger length units (where these must be defect-free in such length units), a small defect can lead to a comparatively large economic loss since a larger length of the produced material is to be considered as rejects (or as defective goods whose sale price is significantly reduced). Such an economic loss is naturally undesirable.

The said problems of an incorrect shed opening (and other faults) increase with increasing working speed of the weaving machines.

There is therefore increasing interest in the fact that not only the actual weaving process runs automatically but also that as permanent as possible, complete and continuously automated monitoring of the quality of the weaving product takes place during its formation.

For this purpose various monitoring devices have already been proposed in the prior art.

Thus, for example, in the German Unexamined Laid-Open Patent Application DE 34 353 91 A1, an arrangement for monitoring and control in weaving machines by means of a video camera is described. The video camera records an image of warp and fabric at the beat-up edge. This information is supplied to a pattern recognition device, imaged on a monitor and analyzed. The camera apparatus is in this case disposed above the shed in the region of the beat-up edge of the reed. The camera apparatus is in this case independent of the batten and disposed rigidly with respect to the "remainder of the weaving machine" (in particular the weaving machine frame).

The disadvantages of this monitoring device are that it is relatively far removed from fabric and threads, that it must take vibrations of fabric and threads into account, that it needs space on the weaving machine, at best the view for the weaver of the fabric is impeded and that the batten is mobile relative to the camera for monitoring and therefore hinders the recording of images by means of the camera or restricts the region of the weaving machine which can be monitored by the camera.

Known from WO 2006/117673 is a device for monitoring warp threads of a warp in a weaving machine during operation of the weaving machine. This device comprises a camera which (similarly as in the case of the arrangement known from DE 34 353 91 A1) is fixed at a predefined location in relation to the weaving machine. The camera is in this case located above a reed which is used for beating up a weft thread in a shed during a weaving process so that the camera can record images of warp threads during operation of the weaving machine. During the weaving process the reed must be moved to enable the beating up of a weft thread. Since the camera is fixed at a predefined location, the camera is not co-moved with the reed during a movement of the reed so that the spatial position of the reed relative to the camera changes continuously.

The Japanese Patent Application JP H08 302535 discloses a method which is intended to monitor whether warp threads of various warps in a weaving machine are correctly drawn between various dents of a reed. This method is carried out when the weaving machine is at a standstill, i.e. when no weaving process takes place and the reed is specifically not moved. In this method during a stoppage of the weaving machine a photoelectric detector is placed on an upper edge of the reed so that the detector is mounted slidingly on the upper edge of the reed and accordingly is movable in the longitudinal direction of the reed. The detector is then moved in the longitudinal direction of the reed and therefore transversely to the warp threads and thereby moved over all the warp threads of the respective warp. The detector is configured to detect whether warp threads are drawn in between neighbouring dents of the reed and during a movement in the longitudinal direction produces an electrical impulse in each case when the detector recognizes that at least one warp thread is drawn in between two adjacent dents of the reed. The electrical impulses which the detector produces during its movement transversely to the warp threads of the warp are counted by an electronic system and the total number of impulses produced is compared with a corresponding desired value. At the end of the process the detector is removed from the reed again and placed at a location remote from the reed so that the detector does not impede the execution of the weaving process during operation of the weaving machine. Then (after execution of the method is completed), the weaving machine can be put back into operation in order to enable weaving processes to be carried out again. This method does not offer any possibility of monitoring warp threads or weft threads during operating of the weaving machine or during weaving processes. A particular disadvantage is that the detector must be removed from the reed before a weaving process is carried out, especially that the detector is only placed on the reed but not fastened to the reed. If the detector were not removed before the beginning of the weaving process, the detector would be jettisoned from the reed after the beginning of the weaving process, especially as the reed is usually relatively strongly accelerated during a weaving process and is moved at a relatively high speed.

A photoelectric detection arrangement for detection of warp thread breaks with a light beam through the shed is proposed in the patent specification U.S. Pat. No. 3,989,068. In this a light source or a photodetector in the manner of a light curtain is disposed in the region of the shed on both sides of the shed. Light source and photodetector are mechanically connected to the batten and move with this. With the apparatus described there it is only possible to detect warp thread breaks. However, other defects cannot be reliably detected. In particular, it is also not possible to find the location of a warp thread break along the width of the woven material so that it is not possible to determine which of the warp threads of a warp have a warp thread break.

Finally the US Patent Specification U.S. Pat. No. 4,643,230 discloses an inspection device only for woven fabrics which is configured as a detector head and which is moved to and fro with the aid of a drive device successively over the width of the woven fabric. A light source and a photodetector are located in the detector head. Specific weaving defects can be identified using the arrangement described there. As a result of the mode of operation of the apparatus described there, the problem usually arises that a defect is only detected when several centimeters of material have been woven between the occurrence of the weaving defect for the first time and a detection of the same. Furthermore, some weaving defects cannot be detected or only with difficulty. Consequently problems also exist here.

There is therefore interest in providing an apparatus or a method which makes it possible to more rapidly detect a weaving defect, to localize the defect as accurately as possible (in particular along the width of a piece of weaving and in the direction of a weft thread of the piece of weaving) and/or to detect a larger number of weaving defects.

The object of the invention therefore consists in providing a monitoring device for a weaving machine which is improved compared with monitoring devices for weaving machines as known in the prior art. Another object of the invention consists in proposing a weaving machine which is improved compared with weaving machines as known in the prior art.

Furthermore, it is an object of the invention to provide a method for monitoring warp threads of a weaving machine which is improved compared with methods for monitoring the warp threads of a weaving machine such as are known from the prior art.

The invention solves this object.

It is proposed to configure a monitoring device for a weaving machine in such a manner that this monitoring device comprises at least one camera apparatus and a weft-thread beat-up device, wherein the weft-thread beat-up device comprises at least one reed and/or a batten and the reed and/or the batten extend in a longitudinal direction of the weft-thread beat-up device.

According to the invention, the at least one camera apparatus is fastened to the weft-thread beat-up device and comprises a plurality of sensor elements arranged adjacent to one another. The camera apparatus is configured to record an image by means of the sensor elements wherein the sensor elements are arranged in a row which extends substantially parallel to the longitudinal direction of the weft-thread beat-up device.

Since the weft-thread beat-up device comprises at least one reed and/or one batten and the reed and/or the batten extends in a longitudinal direction of the weft-thread beat-up device, the weft-thread beat-up device is configured during a movement from a rear position into a beat-up position, to convey a weft thread into a position extending along a weft thread beat-up line, where the weft thread beat-up line usually extends substantially parallel to the longitudinal direction of the weft-thread beat-up device. Since the at least one camera apparatus is fastened on the weft-thread beat-up device, it is ensured that the at least one camera apparatus is co-moved with the weft-thread beat-up device during a movement of the weft-thread beat-up device. Since the camera apparatus comprises a plurality of adjacently disposed sensor elements which are disposed in a row extending substantially parallel to the longitudinal direction of the weft-thread beat-up device and since the camera apparatus is configured to record an image by means of the sensor elements, it is ensured that the camera apparatus can record an image which enables an image analysis along a line or direction running substantially parallel to the longitudinal direction of the weft-thread beat-up device.

Since the at least one camera apparatus is fastened on the weft-thread beat-up device, it is ensured that the camera apparatus, for example when the weft-thread beat-up device is installed in a weaving machine, can record an image of warp threads in such a manner that the image enables an image analysis along a direction running substantially parallel to the longitudinal direction of the weft-thread beat-up device, e.g. along a direction running substantially parallel to the weft thread beat-up line.

The term "weft thread beat-up line" is to be interpreted hereinafter in such a manner that a "weft thread beat-up line" in connection with a "weft-thread beat-up device" forms a line which usually extends along a direction running substantially parallel to the longitudinal direction of the weft-thread beat-up device (unless stated otherwise).

For each recording of an image the camera apparatus produces image data which correspond to a representation of the image and which are analyzed in order to detect various weaving defects on the warp threads but possibly also on the weft threads and on the woven fabric during a weaving process. An "image analysis" of the image comprises, for example, an analysis of the image data provided by the camera apparatus.

"Weaving process" should be understood in this context as a plurality of weft insertion cycles which are executed with the same reed and the same repeat of draft on the weaving machine (the repeat of draft contains in particular for each warp thread of a warp, information about those passages which are formed in the respective reed for guiding through warp threads into which a certain warp thread of the warp is drawn).

Since the respective image according to the invention enables an image analysis along a direction running substantially parallel to the weft thread beat-up line, it is ensured that the respective weaving defect can be localized with high precision, in particular with reference to a coordinate axis which extends substantially parallel to the weft thread beat-up line (e.g. parallel to a longitudinal direction of the weft-thread beat-up device).

The camera apparatus can be fitted with one or more optical image sensors which, for example, can be configured as a CCD device, a CMOS device or as a photodiode array. Such camera apparatuses are comparatively light, have low energy consumption and are commercially available. Furthermore these usually have an adequate optical recording quality for monitoring in a weaving machine. In first tests such devices have proved suitable for the presently proposed monitoring device.

The weft-thread beat-up device comprises any device with which a newly inserted weft thread or a plurality of newly inserted weft threads can be moved towards an already finished region of a woven fabric along a weft thread beat-up line during a weaving process. In a weaving machine, the movement of the weft-thread beat-up device during weaving usually takes place between two end positions (e.g. between a rear position and a beat-up position which is described in further detail hereinafter) and can be achieved in particular at least with the weaving machine drive or an independent drive. The camera apparatus can also be substantially arbitrarily designed as long as it is suitable for recording an image of a spatial region in the surroundings of the weft-thread beat-up device and particular of the warp threads. In particular a "camera apparatus" is to be understood not only as a camera apparatus which detects at least partially in the visible spectral range of the light. It is also possible that detection takes place, for example in the infrared and/or ultraviolet region. According to the invention, the camera apparatus is connected mechanically to the weft-thread beat-up device so that the camera apparatus is co-moved with the weft-thread beat-up device when the weft-thread beat-up device is moved. That means that this follows the movement of the weft-thread beat-up device when the weft-thread beat-up device is moved to and fro, for example, between the beat-up position and the rear position. The camera apparatus is fastened "rigidly" to a certain region of the weft-thread beat-up device (or a plurality of regions of the same). The camera apparatus to a certain extent follows the movement of the weft-thread beat-up device "one to one" on the weaving machine which can result in a particularly high measurement quality. In this way, at least a part of the width of the spatial region of a weaving machine in which the warp threads to be woven are located (in particular in a region in which a shed can be formed) and/or the width of the woven fabric produced by means of the weaving machine can be recorded optically by means of the monitoring device. The recording is preferably accomplished in such a manner that substantially at each time point at least 10% of the aforesaid width can be recorded (at least in a regular operation of the monitoring device). At the same time at least—in addition to an analysis of the image in a direction running substantially parallel to a weft thread beat-up line—an analysis of the image can also be made in other directions (for example, in the "warp thread direction", i.e. substantially perpendicular to the weft thread beat-up line and parallel to the woven fabric which is produced from the warp threads in a weaving process). It is even feasible that the weft-thread beat-up device is used for detection of warp thread breaks with a precise localization of the respective warp thread break (instead of a conventional detection by means of lamellae).

The camera apparatus usually comprises an image sensor which contains a plurality of light-sensitive, respectively adjacently disposed sensor elements so that the image sensor delivers a digital representation of an image to be recorded with the camera apparatus comprising a plurality of adjacently disposed pixels (where one pixel, for example, corresponds to a sensor element of the image sensor). In particular, the pixels or the sensor elements are arranged at least in a row which extends substantially along a direction running parallel to a weft thread beat-up line. An image analysis along this direction is therefore possible. In particular, it is advantageous if the spatial resolution (pixel size) of the image sensor is selected in such a manner that a warp thread is represented with several pixels which are disposed adjacent to one another in a direction running parallel to a weft thread beat-up line. In this case, it can therefore be determined decisively which warp thread has a problem. Independently of the specific design of the monitoring device or the weaving machine, the proposed monitoring device has the advantage that vibration movements between camera apparatus and threads/woven fabric during operation of a weaving machine are severely reduced since the threads or the woven fabric are each held at predetermined positions on the weft-thread beat-up device (e.g. by means of a reed) and the camera apparatus is fastened to the weft-thread beat-up device in such a manner that during the weaving process the camera apparatus has no other movement than a co-movement with the weft-thread beat-up device. This enables an automatic image processing of an image recorded with such a camera apparatus with a relatively short computation time. In known monitoring devices according to the prior art (e.g. DE3435391), the position of the weft-thread beat-up device with respect to the camera varies substantially as a result of vibrations during operation of the weaving machine which is why an automatic image processing of an image recorded with such a camera usually requires a substantially longer computation time because at the beginning of the image processing usually a spatial reference must initially be determined for each image (in order to compensate for the variation of the spatial position of the camera with respect to the weft-thread beat-up device caused by the respective vibrations) and a determination of this reference requires a relatively long computation time.

Furthermore, thanks to the movement of the camera apparatus together with the weft-thread beat-up device it is also possible to record images in different positions of the weft-thread beat-up device within a weft insertion cycle so that a partially greater spatial area (in particular along the warp thread direction or along the longitudinal direction of warp threads) can be visually inspected. This also has advantages because the orientation of the camera apparatus varies during movement with respect to the threads and the woven fabric so that, for example, it is possible to observe various defects, for example, various defects which are only visible from different perspectives. In particular, specific types of defects can be determined by this means which hitherto could only be partially determined with difficulty (for example, an undesired change in the diameter of a thread, which can exclusively be formed in a single specific direction, so that this change in diameter cannot be detected in a visual inspection if the inspection is exclusively made in this one direction). Also if the warp threads vibrate during a weaving process, one is certain to obtain at least one correctly focussed image within a weft thread insertion cycle since the perspective of the camera apparatus varies continuously when the weft-thread beat-up device is moved (in this case the distance of the warp threads to be monitored varies relative to the camera apparatus and optionally with respect to an imaging optics of the camera apparatus for imaging the warp threads to be monitored on an image sensor of the camera apparatus). Furthermore the inventors have determined that a staggeringly large improvement in the inspection quality can be achieved by the proposed arrangement.

The weft-thread beat-up device can comprise a reed or a batten or alternatively a batten and a reed. If the weft-thread beat-up device comprises a reed and a batten, the reed can for example be fastened to the batten. The mechanical coupling between the camera apparatus and one of the aforesaid devices can in particular be accomplished by a direct and immediate mechanical fastening to the relevant device. If the weft-thread beat-up device has at least one reed and/or a batten, this weft-thread beat-up device largely resembles hitherto known weft-thread beat-up devices and enables the beat-up of a weft thread onto a weft thread beat-up line which can extend preferably parallel to the longitudinal direction of the reed or the batten. In other words, the reed or the batten conveys a weft thread into a position extending along a weft thread beat-up line. In contrast, the presently proposed reed or the previously described batten (in each case together with the camera apparatus fastened thereon) can serve in a comparatively simple manner as replacement for a hitherto known reed or a hitherto known batten (for example, as substantially direct exchange, i.e. substantially without any matching requirements with regard to the weaving machine, in particular with regard to the mechanical structure of the weaving machine).

The aforesaid variant has the advantage that the batten or the reed is the element of the weaving machine located closest to the weaving zone where the weaving zone is located around the weft thread beat-up line and the shed. The weaving zone is the best (and last possible) point of intervention during the formation of a woven fabric (by producing "bonds" between warp threads and weft threads) in order to detect and correct disturbances or defects. All the static elements of the weaving machine are relatively far removed from the weaving zone, and the closer the camera apparatus to the weaving zone, the better the quality of the images and consequently the quality of the monitoring.

In the case of the aforesaid variant of the monitoring device, the camera apparatus can be arranged in such a manner that (unlike the prior art according to DE3435391), at least one of the (reed) collars of the reed cannot appear on the images recorded by the camera apparatus and therefore nothing can be concealed by a reed collar of the reed on the recorded images.

A further possible embodiment of the monitoring device is obtained if a plurality of camera apparatuses is provided. The plurality of camera apparatuses are arranged in a longitudinal direction extending parallel to the weft thread beat-up line. The weft-thread beat-up device usually extends in a direction extending parallel to the weft thread beat-up line and accordingly has a longitudinal direction which extends substantially parallel to the weft thread beat-up line. The camera apparatuses can therefore expediently be arranged in a row along the longitudinal direction of the weft-thread beat-up device. An image analysis along the longitudinal direction is therefore possible. In this case, the image regions of the camera apparatuses can be designed to be overlapping with one another in some regions, preferably designed to be overlapping at least in the longitudinal direction of the weft-thread beat-up device (the term "image region" of a camera apparatus is to be understood in this connection to be that spatial region of which an image can be recorded by means of the respective camera apparatus). In particular, at least two of the camera apparatuses can be disposed adjacent to one another in such a manner that the image regions of these two camera apparatuses overlap. Preferably the image regions of respectively two camera apparatuses which are disposed directly adjacently to one another (i.e. neighbouring), overlap. If the image regions of several camera apparatus are overlapping with one another in some regions, the individual camera apparatuses can advantageously each be configured to be simpler, smaller and more cost-effective than another (larger) camera apparatus which alone is intended to record substantially one image of the same spatial region as the entirety of all the camera apparatuses of the said plurality of camera apparatuses and optionally (also in total) can have a lower weight. If the image regions of the camera apparatuses overlap one another in some regions, it can advantageously be prevented that visual inspection gaps are formed which for example could lead to a weaving defect remaining undetected. The overlap can for example be given in each case only at the edge side in relation to respectively two neighbouring image regions of two adjacently disposed camera apparatuses (for example, overlap per edge side ≤30%, 20%, 15%, 10%, 5% of a width of the image region of an individual camera apparatus).

In the event that a plurality of camera apparatuses are fastened to the weft-thread beat-up device, it is advantageously possible to perform a calibration of the images recorded with different camera apparatuses. For this purpose, a normalized measurement scale which has a plurality of reference markings whose positions on the measurement scale are precisely known can be arranged in such a manner relative to the camera apparatuses that one or preferably a plurality of reference markings fall in the image region of each camera apparatus. Then an image of the measurement scale is recorded with each of the camera apparatuses and the images recorded with the different camera apparatuses are evaluated, in particular with regard to the arrangement and/or the size of the reference marks images on the images in each case. This evaluation of the images makes it possible to determine the respective position relative to the measurement scale for each camera apparatus and furthermore to determine the spatial position of the various camera apparatuses with respect to the weft-thread beat-up device. The calibration can be performed in one spatial dimension or in two spatial dimensions, for example, measurement scales can be used for the calibration on which a plurality of reference markings are each arranged consecutively in one spatial dimension or distributed in two spatial dimensions. A particularly precise calibration is possible if the image regions of adjacent camera devices overlap. In this case, it is advantageous to arrange one measurement scale with reference markings in such a manner that in each case at least one reference marking falls within the region of overlap of the image regions of two neighbouring camera apparatuses in each case so that with respectively two camera apparatuses, respectively one image of the same reference marking can be recorded. By means of an evaluation of the images of the same reference marking recorded with different camera apparatuses, the relative arrangement of respectively two neighbouring camera apparatuses can thus be determined. This information can then be used in an automatic processing of images of an arbitrary object which was recorded with the camera apparatuses in order to be able to precisely determine the position of the object relative to the camera apparatuses by an evaluation of the images.

After the aforesaid calibration, the camera apparatuses no longer require any spatial reference in order to detect the position of each individual warp thread drawn into a reed for the entire weaving process if the camera apparatuses according to the invention are fastened rigidly to the weft-thread beat-up device, especially the camera apparatuses can usually record images of a plurality of warp threads lying next to one another in a weaving machine and each warp thread is usually restricted in space (in each case in the weft direction) by respectively two neighbouring dents of the reed. Since it is usually specified by the repeat of draft for the entire weaving process individually for each warp thread of the warp between which dents of the reed the respective warp thread is drawn, it is possible to make an assignment of the warp threads in which, to each of the warp threads to be monitored, at least one of the pixels is assigned, i.e. after performing the entire assignment for the entire weaving process it is clear which of the warp threads can be represented with which pixels of the respective image.

In a further development of the aforesaid embodiments of the monitoring device, at least two camera apparatuses and at least one lighting device are disposed in a module, where this module additionally at least comprises: a common image control device for triggering the at least two of the camera apparatuses in order to cause these at least two of the camera apparatuses to record images and/or a common image processing device for processing the images recorded by these at least two camera apparatuses. This module is connected mechanically to the weft-thread beat-up device and in particular fastened on the weft-thread beat-up device. For this purpose, it is proposed to mount all the components contained in the module (at least two camera apparatuses, optionally one common image control device, optionally one common image processing device, optionally at least one lighting device) for example jointly on a support structure which is connected mechanically to the weft-thread beat-up device or will be connected. In the event of failure of an individual module, only one replacement part must be provided for the module and then prepared in a comparatively short time as replacement for the failed module. This enables a significant reduction in the down time of a weaving machine and is accordingly advantageous. To this end, it is advantageous to reduce the number of image processing devices and image control devices and, for this purpose, to connect one image processing device and one image control device to, for example, 2 to 8 camera apparatuses.

The lighting device, which for example can comprise an arrangement of light-emitting diodes (LEDs) can preferably be configured to produce light having different light colours and/or a broad spectral range with an illumination time shorter than the vibration period of the weaving machine, wherein the at least one lighting device is preferably coupled mechanically to the weft-thread beat-up device, in particular is coupled mechanically to at least one camera apparatus. In this way, an illumination optimized for a specific inspection purpose (e.g. for the search for a specific weaving defect) and/or the respective camera apparatus can be implemented in a simple and energy-efficient manner. Furthermore, in such a configuration of the lighting device, a particularly uniform illumination quality can be achieved, even when the weft-thread beat-up device is moved. It is also advantageous that when different camera apparatuses are disposed on the weft-thread beat-up device, a respectively optimized illumination can be achieved in each case with the aid of different lighting devices.

It is furthermore pointed out that during operation of the weaving machine (if the weft-thread beat-up device is moved and the lighting device is co-moved accordingly), the lighting device is mobile with respect to the warp threads, the weft threads and the woven fabric so that the respective threads or the woven fabric can be illuminated temporarily consecutively at different illumination angles. Advantageously there are different illumination angles which are suitable for making different defects visible and therefore determining them.

It is further proposed that in the weft-thread beat-up device at least one vibration damping device is disposed between the camera apparatus and the weft-thread beat-up device. With a vibration damping device, the mechanical loading, in particular on the camera apparatus (optionally also on additional components such as image processing device and the like) can be reduced so that the lifetime of the same can in part be significantly increased. The vibration damping device can, for example, be implemented using elastically deformable elements (type of rubber buffer elements or the like). If the camera apparatus is disposed on a support structure, the vibration damping device can be disposed between the support structure and the weft-thread beat-up device or between the support structure and each camera apparatus.

It is further proposed to provide an adjusting device for the camera apparatus which enables the camera apparatus to be adjusted relative to the weft-thread beat-up device before the weaving process. In this case, the position of the camera apparatus relative to the weft-thread beat-up device or at least to parts of the weft-thread beat-up device (for example, relative to a reed, a batten or another structural component of the weft-thread beat-up device) or to a woven fabric can be corrected and optimized in a simple manner. For example, adjusting screws and the like are feasible here.

It is further proposed to configure the monitoring device in such a manner that at least one image processing device for processing of an image recorded by the camera apparatus, in particular at least one image pre-processing device, and a data storage device which is in data communication with the image processing device, are provided. The image processing device and the storage device are in this case preferably mechanically connected to the weft-thread beat-up device. The image processing device and the storage device can also be configured jointly with the camera apparatus. The image processing device and the data storage device should be co-moved to a certain extent with the weft-thread beat-up device. Since the weft-thread beat-up device is regularly moved in the operational state, it would initially be required that a "mobile" (that is, for example bendable, compressible and the like) and broad-band data communication must be provided between weft-thread beat-up device and other device (i.e. for the "remaining weaving machine", in particular the housing or the retaining frame of a weaving machine). However, this is not without its problems especially for the case of particularly high data transmission rates. For example, a coaxial line, a glass fibre cable or other data line which is suitable for the transmission of high-frequency data rates could be provided. The image processing device can in particular be configured in such a manner that this performs a processing of the image data produced by the camera apparatus, in particular in such a manner that the amount of data to be processed is reduced and/or the image data are already analyzed with algorithms. For analysis of a recorded image, the image processing device can, for example, compare image data with data or information stored in the data storage device (for example, data which specify a repeat of draft and/or binding information for a woven fabric to be produced) in order to detect weaving defects. In particular, this image analysis performed by the image processing device can determine information about the position of the weaving defect with reference to an axis of a coordinate system which extends substantially parallel to the longitudinal direction of the weft-thread beat-up device or parallel to the weft thread beat-up line. As a result of a reduction in the amount of data, the processing speed can be increased so that in particular approximately "real time data processing" is possible. This can involve image compression algorithms in order to "cut out" the relevant image information or a "complete image processing" in which only the output signal is to be communicated (i.e. that for example, a freedom from defects within the tolerable frame exists or that a defect exists and preferably where it is located). For the sake of completeness, it should also be mentioned that it is also possible that in the case of an image processing device moved together with the weft-thread beat-up device, only a pre-processing takes place and a final processing to the output signal takes place in a second step at a different location (for example, in a control device of a weaving machine). The storage device which is also moved with the camera apparatus and which is in data communication with the image processing device assists with carrying out the pre-processing of the data by storing the input data required for the pre-processing and/or results of this pre-processing.

A further preferred embodiment of the monitoring device comprises a data transmitting device for wireless data transmission. This data transmitting device can be configured, for example, to wirelessly transmit that data which is delivered directly by the camera apparatus (raw data) or which can be provided by the image processing device (in particular processed data which is generated by the image processing device and which for example, correspond to a result of an analysis of a recorded image). At least one of the required "data transmission stations" is in this case preferably connected mechanically to the weft-thread beat-up device and therefore moves jointly with this. This wireless data transmitting device has the task of transmitting image data which can be provided by the camera apparatus or data which is produced by the image processing device by a processing of the image data as a result of an analysis of the image data, from the weft-thread beat-up device to other devices (e.g. to other image processing devices or a control device), which can be located at a distance from the weft-thread beat-up device (e.g. in the retaining frame of the weaving machine), and has the task of possibly receiving data from this other device. This avoids the problem of cabled data transmission between the respective image processing device and the rest of the weaving machine. A wireless data transmission is substantially insensitive for the present distances and distance variations.

A further preferred embodiment of the monitoring device is obtained if in addition, at least one sensor device which (in contrast to an optical image sensor of the camera apparatus) is not used directly for recording one of the images and which differs from the camera apparatus, is fastened to the weft-thread beat-up device and is in data communication with the image processing device and/or with an image control device (for triggering one or more camera apparatuses in order to cause the respective camera apparatus to record an image) in order, for example, to provide information to the image control device and/or the image processing device which can be provided by the sensor device. With the aid of this information, an instantaneous position of the weft-thread beat-up device is determined. The sensor device can be a position determining device and/or an acceleration determining device and/or a vibration determining device and/or a location determining device. In this case, it is pointed out that it is naturally possible that the additional sensor device is also (partially) of an optical type. Regardless of the special design of the additional sensor device, by this means information can be obtained about a movement and/or the instantaneous position (movement position) of the weft-thread beat-up device in a weaving machine (in particular during operation of the weaving machine). For example, the position of the weft-thread beat-up device can be determined by means of a position determining device and therefore possibly also the position of a weaving defect which may occur (in particular in a direction parallel to the warp thread direction or substantially perpendicular to the weft threads). A position determination can also be achieved by "alternative measurement methods", such as for example by an acceleration determining device, a vibration determining device and/or a location determining device. Thus, for example, it is possible that the two end positions of the movement of the weft-thread beat-up device can be determined with an acceleration determining device and the instantaneous position of the weft-thread beat-up device can for example be determined by extrapolation methods or similar in the image control device and/or in the image processing device, at least approximately. The accuracy which can thus be achieved is frequently found to be sufficient.

Thus, the image control device or the image processing device does not require any position information which comes from the weaving machine or a control device of the weaving machine with regard to the instantaneous position of the weft-thread beat-up device in order to control the recording of images and/or a further processing of the respectively recorded images as a function of the instantaneous position of the weft-thread beat-up device relative to the weft thread beat-up line.

A further preferred embodiment of the monitoring device is provided with a synchronizing unit which is configured to synchronize the camera apparatus with an instantaneous position of the weft-thread beat-up device in order to control the camera apparatus depending on a specific movement position of the weft-thread beat-up device. The synchronizing unit enables at least one operating process of the camera apparatus, e.g. the recording of an image and in particular a time at which the respective image should be recorded, to be matched temporally with a movement of the weft-thread beat-up device and to control this at least one operating process as a function of a movement position of the weft-thread beat-up device. It is therefore possible to record images in each case at various predefined positions of the weft-thread beat-up device and analyze as a function of the position at which the image is recorded.

It is further proposed to configure the monitoring device in such a manner that the entirety of all the image regions of the respective camera apparatuses extend over a region of a weaving machine which is dimensioned in such a manner that substantially each of the warp threads present in the weaving machine extend through at least one image region of one of the camera apparatuses. In the case of this embodiment of the monitoring device, accordingly substantially each warp thread of a warp (also warp threads forming the weaving edge) can be imaged on at least one image of at least one camera apparatus and thus monitored by the monitoring device. In this case, the spatial region in which warp threads or a woven fabric can be monitored by means of the monitoring device (hereinafter called "monitoring region of the monitoring device") extends substantially over the entire width of the warp ("warp width") or the entire width of a woven fabric. Such a monitoring device can optionally also be implemented by means of a single camera apparatus if the image region of the camera apparatus is accordingly large and extends substantially over the entire warp width or the entire width of the woven fabric. The aforesaid embodiment can, for example, be implemented by the weft-thread beat-up device having a longitudinal section on which a plurality of passages for warp threads are formed between the dents of a reed in such a manner that the passages are arranged in the longitudinal direction of the weft-thread beat-up device consecutively in a row, wherein the camera apparatuses are arranged consecutively in such a manner that the entirety of all the image regions of the camera apparatuses extend in a direction parallel to the longitudinal direction of the weft-thread beat-up device (or parallel to the weft thread beat-up line) over a distance which is greater than or equal to the length of that longitudinal section of the weft-thread beat-up device in which the passages are formed.

If the monitoring region of the monitoring device extends (substantially) over the entire longitudinal section of the weft-thread beat-up device on which the passages for the warp threads are formed, "blind spots" can be avoided during the monitoring. In other words, it can be avoided with a high probability that weaving defects remain undiscovered. This usually proves to be particularly economical.

In one variant, the arrangement of a camera apparatus in a lateral region of the entire warp ("warp width") or the entire woven fabric has proved particularly advantageous. In particular a weaving edge is here understood as "lateral region".

It is further proposed to configure the monitoring device in such a manner that the camera apparatus is connected mechanically to a collar of a reed. It is disposed in such a manner that the camera apparatus is always located outside the spatial region ("shed opening zone") through which the warp threads can be moved during opening or closing of a weaving shed during a weaving process, i.e. outside the "shed opening zone". For example, a camera apparatus can be positioned on an upper (first) collar or lower (second) collar or both collars of the reed. Camera apparatuses or further structural elements which are fastened to the weft-thread beat-up device such as, for example, lighting or a support structure, remain outside the shed opening zone during the weaving process in each position of the reed in the weaving machine. These elements remain outside passages of the warp threads between the dents (reed dents) which in the case of a conventional reed, are disposed consecutively in a row and extend between the upper (first) collar and the lower (second) collar of the reed. Corresponding advantages are achieved for the case that the reed has a plurality of passages for warp threads which passages each extend between a first collar of the reed and a second collar of the reed, and the camera apparatus is arranged in such a manner on the first collar or on the second collar that the camera apparatus does not completely or partially block or restrict any of the passages.

It is further proposed to configure a weaving machine with at least one weft-thread beat-up device according to the previous description.

In particular, it is possible to further configure a weaving machine in such a manner that this has at least one control device, wherein the control device is configured for triggering at least one component of the weaving machine. Such a component of the weaving machine can in particular comprise at least one weft-thread beat-up device and/or at least one weft thread guiding device and/or at least one weft thread delivery device and/or at least one web forming device and/or at least one warp thread transporting device and/or at least one woven fabric transporting device whose movements are controlled with the control device. This control device receives data directly or indirectly from the camera apparatus. The term "indirectly" in this context means that the control device receives data which originally comes from the data provided by the camera apparatus as a result of a pre-processing or a processing of the data with a corresponding pre-processing device or processing device. In such a configuration of the weaving machine, it is possible that the data obtained using the camera apparatus (and possibly another sensor device such as in particular an additional sensor device of the type described previously) can be used directly and optionally without further user intervention. It is possible, for example, that this comprises a type of "emergency stop device" so that in particular when specific defects occur or in a case when a certain defect tolerance range is exceeded, the further weaving process is immediately shut down. In such a case, the machine operator can take suitable correction measures and then continue the weaving process (automated). However it is also possible that "corrective" measures are taken, i.e. that the machine control is adapted in such a manner that the defect which has occurred is reduced and preferably "returned to zero". This is particularly appropriate when a certain defect tolerance interval has not yet been departed from. In such a configuration of the weaving machine, frequently per se unnecessary machine down times can be avoided which can considerably help to increase the economic viability of the device.

It is further proposed to configure the weaving machine in such a manner that this comprises at least one defect display device, in particular at least one visual defect display device. This can not only comprise a device which displays "binarily" whether a defect is present or not. It is preferable if the defect display device displays at least approximately where the defect has occurred. This can, for example, comprise a symbol image on a screen, which indicates the position of the defect. It is also possible that a type of light display device is fastened, for example, directly above the shed region, which is triggered after the occurrence of a defect in such a manner that a light spot, a light region, an arrow or another appropriate symbol indicates the location of a defect. This can, for example, comprise a type of region (for example, display of five or ten warp threads precisely onto a region). However, it is also feasible that the triggering is accomplished in such a manner that the display is accomplished "correct to the warp thread". Additionally or alternatively, not only one display can be made along the width or in the direction of the weft thread beat-up line but also along the warp thread. It is possible that the defect display device comprises a lighting device which is preferably to be provided in any case, which for example is only triggered in a suitable manner (energizing of only parts of the lighting device or the like). This can comprise the lighting device already described previously which is also used for recording images by means of the camera apparatus (in order to illuminate surroundings of the camera apparatus). It is therefore also possible to be able to claim the defect display device merely in connection with the weft-thread beat-up device (and without other components of the weaving machine or the weaving machine itself).

A method for (optical) monitoring at least warp threads of a weaving machine with a camera apparatus wherein the weaving machine comprises a movable weft-thread beat-up device which during a movement from a back position into a beat-up position during a weaving process conveys a weft thread into a position extending substantially parallel to a longitudinal direction of the weft-thread beat-up device (e.g. into a position extending along a "weft thread beat-up line"), and wherein the camera apparatus is co-moved with the weft-thread beat-up device during a movement of the weft-thread beat-up device of the weaving machine and the camera apparatus records an image at at least a specific position of the weft-thread beat-up device during a weaving process.

A synchronizing unit is used to control the illumination and the recording of images by means of the camera apparatus as a function of a certain position of the weft-thread beat-up device and to provide each recorded image with a time stamp (for example, with a digital signature which contains the respective time of recording of the image). For this the synchronizing unit needs information about the current position of the weave repeats, input data such as the desired reed position for each image to be recorded for each weft thread insertion cycle and information about the instantaneous position of the weft-thread beat-up device possibly from the sensor device (e.g. acceleration meter to determine an acceleration of the weft-thread beat-up device) which provides information about the correct position or the movement of the weft-thread beat-up device and the respective camera apparatus.

The method according to the invention can in this case, at least by analogy, have the same properties and advantages as the monitoring devices according to the invention which have already been described previously. In particular it is possible to monitor a certain spatial region of the weaving machine when an image is recorded in a certain position of the weft-thread beat-up device during the weaving process. The same type of movement of camera apparatus and weft-thread beat-up device of the weaving machine can be accomplished in particular by a mechanical coupling between the camera apparatus and the weft-thread beat-up device (reed or batten).

During operating of the weaving machine, the weft-thread beat-up device is usually moved to and fro between two positions, a first position (also called "rear position") and a second position (also called "beat-up position") where the weft-thread beat-up device is brought into the beat-up position to convey a weft thread being inserted into the opened shed onto the weft thread beat-up line and the weft-thread beat-up device is then brought into the rear position. Controlled by the synchronizing unit, the camera apparatus preferably records images within a weft thread cycle as follows:

at least one image when the weft-thread beat-up device is in the rear position, where the shed is open in this case and the warp threads nearest to the camera apparatus (i.e. the upper warp threads when the camera apparatus is located above the warp threads) and, e.g. reed dents appear at the forefront on the recorded image;

at least one image when the weft-thread beat-up device is in the region of the beat-up position, where the recorded image represents the already produced woven fabric (with the last beat-up weft thread and the last inserted weft thread);

one or more additional images when the weft-thread beat-up device is brought into one or more intermediate positions between the rear position and the beat-up position or between the beat-up position and the rear position, where these additional images are usually recorded when the shed is totally open (the shed can possibly not be open or not totally open when the weft-thread beat-up device is in the rear position) after the weft thread is normally inserted or should be inserted and when the shed closes and thereby changes; usually the warp threads of the shed, which are not being monitored when the weft-thread beat-up device is located in the rear position, or the inserted weft thread, especially in these intermediate position of the weft-thread beat-up device the distance between the camera apparatus and the warp threads or the distance between the camera apparatus and the weft thread varies in such a manner that certain threads can be located in a suitable position in order to be monitored with the camera apparatus.

The camera apparatus records at least one image in a certain position of the weft-thread beat-up device during the weaving process.

Even if it is frequently found to be sufficient if images are recorded or image data are acquired at at least two different specific movement positions of the weft-thread beat-up device during the weaving process (for example, in each case when the movement position of the weft-thread beat-up device is located at or near one of the two end positions of the movement), it is possible that a data recording takes place at several specific positions and particularly preferably over longer regions continuously, particularly preferably substantially over the entire movement region. In this way, a detection of defects can be made over a region extending along the warp thread direction. As a result, the occurrence of undiscovered defects can be further reduced, which is advantageous.

It is also possible that the method is carried out in such a manner that the at least substantially the same type of movement of the camera apparatus with the weft-thread beat-up device takes place due to a mechanical coupling of the camera apparatus and the weft-thread beat-up device (reed/batten), in particular by using a weft-thread beat-up device and/or a weaving machine according to the previous description. In particular, in such a case the advantages and properties already described can be obtained in at least a similar manner. In particular, at least one similar further development in the sense of the previous description is possible.

It is advantageous if the method is carried out in such a manner that at least in the region of a beat-up position of the weft-thread beat-up device (e.g. at the beat-up position or in the vicinity of the beat-up position) a data acquisition or the recording of an image is made. This can involve not only a single "point" during the movement of the weft-thread beat-up device. In particular, it can also be advantageous if, in the region of the beat-up position respectively one data acquisition is made in several positions of the weft-thread beat-up device. In the region of the beat-up point, the camera apparatus is closest to the woven fabric which is advantageous in order to detect defects on the woven fabric or in the woven fabric. Since the camera apparatus moves with the weft-thread beat-up device, the weft-thread beat-up device can remain outside the image region of the camera apparatus and not conceal anything on the recorded images when the weft-thread beat-up device is located in the vicinity of the beat-up position.

It is also possible that the method is carried out in such a manner that an image processing of a recorded image is carried out in order to detect a defect for one of the monitored warp threads and to localize the defect along a direction running at least partially parallel to the longitudinal direction of the weft-thread beat-up device (parallel to a weft thread beat-up line of the weft-thread beat-up device).

In particular, if the position of the defect (in particular the spatial position along a direction running at least partially parallel to a weft thread beat-up line of the weft-thread beat-up device; i.e. along the weft thread direction) is additionally detected, the correction of the defect can be made particularly rapidly by correcting interventions by a machine user.

In particular it is possible that a partial region of the image region of the camera apparatus is correlated with a region of the woven fabric and/or with a warp thread to be monitored. For example, it can be provided that the camera apparatus records each image in the form of a plurality of adjacently disposed pixels and that before the weaving process each warp thread to be monitored is assigned at least one of the pixels, which corresponds to the part of the spatial region or the image region in which the warp thread to be monitored is prospectively located during the weaving process. In other words, an assignment of the warp threads is performed once for the weaving process (for example, at the beginning of the weaving process) in which, to each of the warp threads to be monitored, at least one of the pixels is assigned. The assignment is valid for the entire weaving process since it depends on the repeat of draw.

With the assignment a processing of the supplied optical data (image data) can be achieved very rapidly because a spatial reference no longer needs to be determined to perform the image analyses of the recorded images (as mentioned). In particular, it is also possible that as a result, a comparatively simple and/or precise determination of position of a possible defect is enabled (in particular with reference to a coordinate axis which extends parallel to the weft thread beat-up line, a precise localization of the defect can be made).

In particular, it is possible that if an image processing of a recorded image detects a weaving defect, a device, preferably a lighting device, is triggered in order to visibly display the position of the defective warp thread which is localized with the image processing. The device can be disposed on the weft-thread beat-up device in order to display the position of the weaving defect (with reference to a coordinate axis extending parallel to the weft thread beat-up line).

In particular it is possible that a "segmenting" is performed, i.e. in each movement position of the weft-thread beat-up device in which an image is recorded, the image region of the camera apparatus is divided into two segments. Then only one of the segments of the image region of the camera apparatus is subjected to a detailed analysis and specifically that segment of which it can be expected that only this segment can contain that information which is to be determined by means of the image processing. This segmenting accordingly enables a specific reduction of the data to be evaluated. In this context, it is advantageous to vary the segmenting depending on the respective movement position of the weft-thread beat-up device in which the image is recorded, i.e. for different movement positions of the weft-thread beat-up device, respectively different segments of the image region are subjected to a detailed analysis. This is expedient with a view to optimizing a data reduction, especially as in different movement positions of the weft-thread beat-up device, in each case images of different objects are recorded by the camera apparatus which are located as expected at different positions relative to the camera apparatus. As a result of this variation of the segmenting as a function of the movement position of the weft-thread beat-up device, a particularly efficient data reduction can accordingly be achieved and therefore a particular rapid image data processing is made possible.

In particular, it is possible that in addition to a monitoring of warp thread defects, the method also enables monitoring of weft thread defects and woven fabric defects. These defects involve the weaving defects which usually occur such as for example an incorrect type (with regard to colour, density and similar) of a warp thread, an incorrect arrangement of warp threads, the absence of a warp thread on account of rupture, a draw-in problem (not the correct colour for example for the warp thread) or a tension problem for a warp thread, the absence of a weft thread or an incorrect insertion of a weft thread, an incorrected type (with regard to colour, density and similar) of a weft thread, a problem with the shedding of the warp threads (incorrect shed angle, incorrect weave patterns and similar), a defect for a reed dent (breaks, distortion and similar), a deviation of the position of the beat-up line, an irregular or incorrect weft thread density in the woven fabric, fly or spots on the surface of the woven fabric. If these defects are identified, it can be concluded with a high degree of certainty that a defect-free product is produced at the respective time. Since the defect detection is usually made particularly rapidly as a result of the characteristics of the proposed weft-thread beat-up device and the proposed method, it is possible to obtain a result and control an action within a weft insertion cycle before the next weft thread is inserted. The said weaving defects (and optionally also additional weaving defects) can in particular be detected by devices and methods known per se in the prior art. In particular, image detection methods or image detection devices which are known for weaving machines and also in other areas of application of the technique and which are possibly still being developed are suitable for this purpose.

Further details of the invention and in particular exemplary embodiment of the proposed devices and the proposed method are explained hereinafter with reference to the appended drawings. In the figures.

Figure 1:
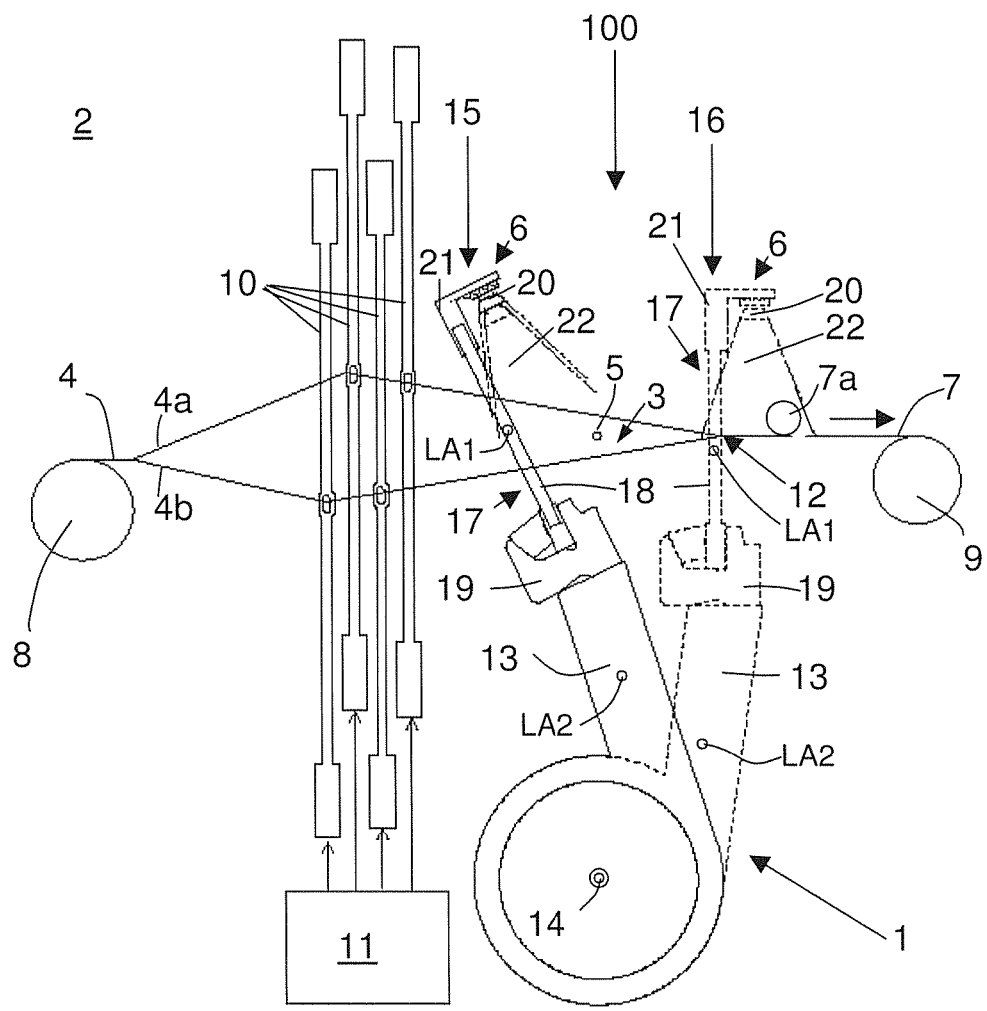
FIG. 1 shows a first exemplary embodiment for a monitoring device with integrated arrangement of camera apparatuses for a weaving machine in schematic cross-sectional view.

FIG. 1 shows a first exemplary embodiment for a monitoring device 100 for a weaving machine 2 in combination with a weft-thread beat-up device 1 in a schematic cross-sectional view. The weaving machine 2 is only indicated schematically, where in the diagram particular emphasis is placed on the region in which the shed 3 is formed from the warp threads 4. According to the present proposal, the weft-thread beat-up device 1 is furthermore provided with a camera arrangement 6 for optical inspection of the warp threads 4 and weft threads 5 to be woven or the already woven fabric 7, which will be discussed in further detail hereinafter.

Figure 2:
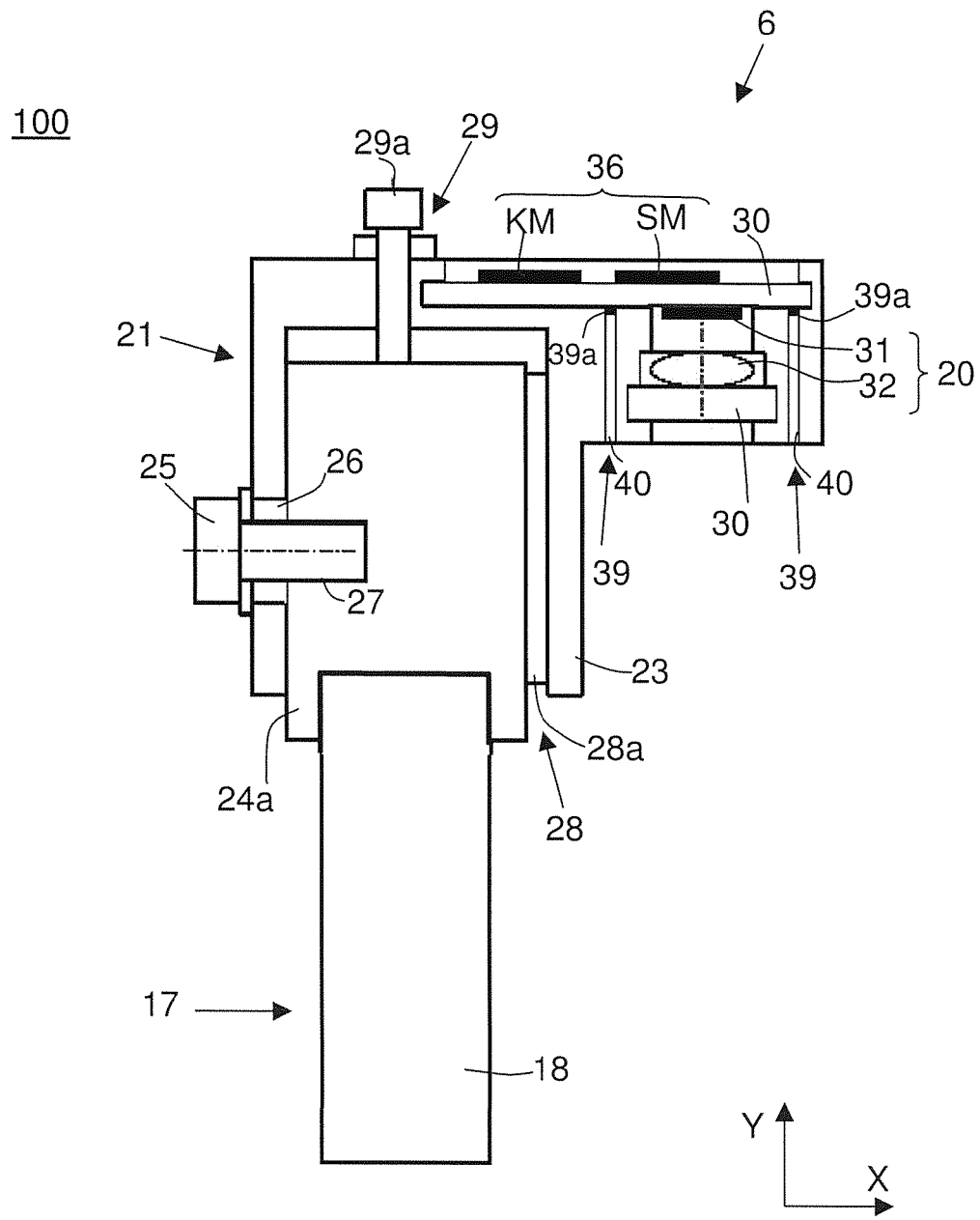
FIG. 2 shows the arrangement shown in FIG. 1 in a sectional enlargement in schematic cross-sectional view.
Figure 3:
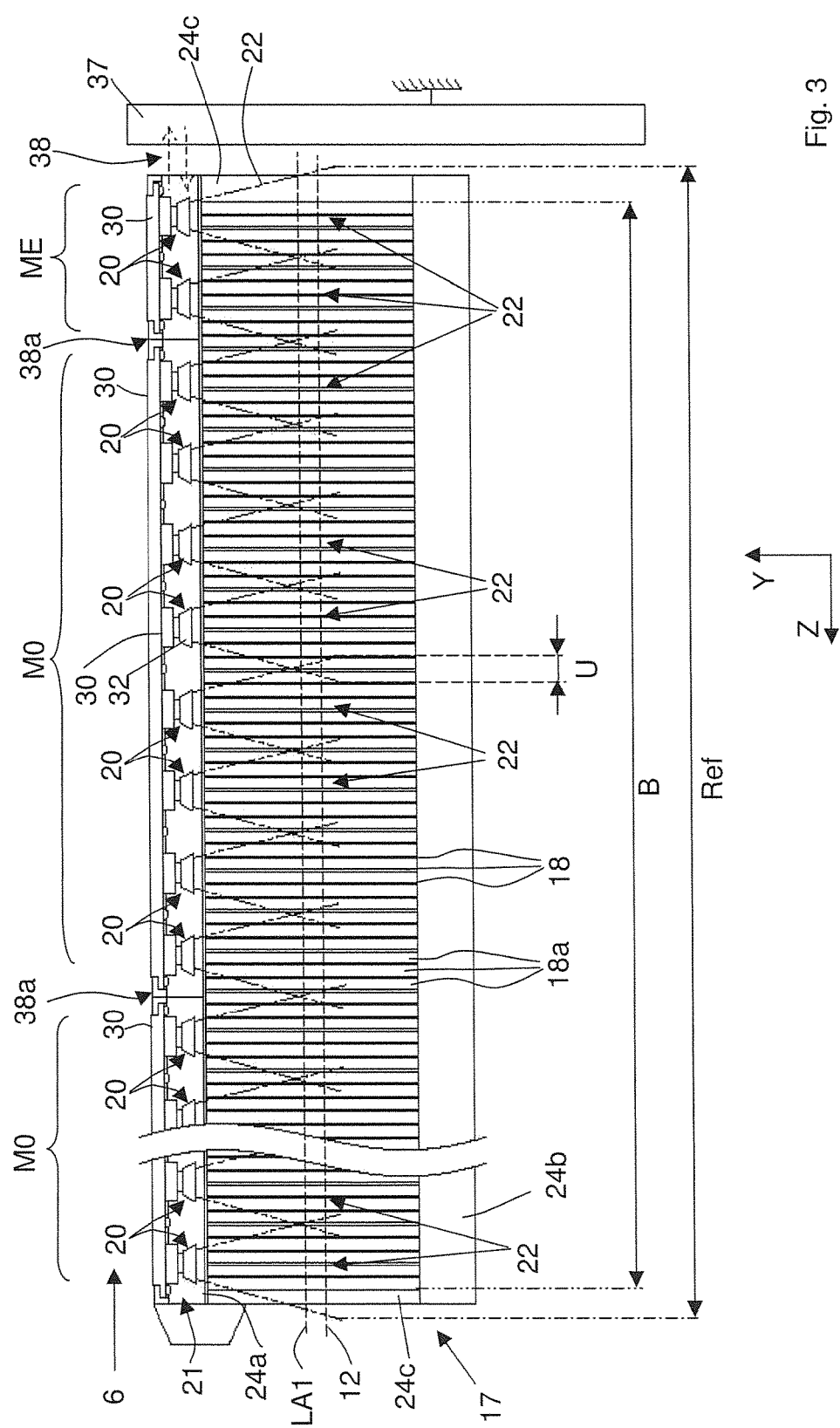
FIG. 3 shows a section of the monitoring device shown in FIG. 1 in a schematic plan view of a reed plane.

In this connection with reference to a coordinate system with coordinate axes X, Y and Z depicted in FIGS. 1-3 it is assumed that the direction of the weft thread 5 (weft direction) extends along the coordinate axis Z whilst the woven fabric 7 is located in a plane located parallel to a plane spanned by the coordinate axes X and Z.

The camera arrangement 6 can comprise one or more camera apparatuses 20 which are configured to record images. In the present example, the camera arrangement comprises a plurality of camera apparatuses 20 whose arrangement relative to the weft-thread beat-up device 1 is characterized in further detail hereinafter. It should be pointed out that the weft-thread beat-up device 1 is inserted into the weaving machine 2 during an operation of the weaving machine 2 and is thereby used as a component of the weaving machine 2. On the other hand, it is provided that the weft-thread beat-up device 1 or at least one or more parts of the weft-thread beat-up device 1 (e.g. a reed 17 which will be explained in detail hereinafter) is also removed from the weaving machine 2 in order to be able to draw-in the warp threads 4 in different passages for the warp threads 4 formed in the weft-thread beat-up device 1, for example for preparation of a weaving process at a location remote from the weaving machine 2.

In the present example, the monitoring device 100 comprises the camera arrangement 6 combined with the weft-thread beat-up device 1 and forms a unit which is used as a whole independently of the weaving machine 2 and for example, can be transported and—if required—mounted into the weaving machine 2 or removed from the weaving machine 2.

The weaving machine 2 has the fundamentally known structure of weaving machines:

A plurality of individual warp threads 4 are spanned between a warp beam 8 and a cloth beam 9. The individual warp threads 4 are divided into two groups 4a, 4b for each weft insertion cycle. Usually the individual warp threads 4 along the transverse direction of the woven fabric 7 (in FIG. 1 along the Y direction) alternately belong to the first group of warp threads 4a or the second group of warp threads 4b. Each individual warp thread 4 is guided in each case by a peddle 10 in such a manner that by means of a corresponding triggering of the peddles 10 with the aid of a shedding mechanism 11 and optionally shafts (if the weaving machine 2 is not a Jacquard machine) a shed 3 is formed in each case.

In the present example, the warp threads 4 are usually arranged in such a manner that each warp thread 4—for the case when no open shed is formed—extends substantially parallel to the coordinate axis X.

Usually the triggering of the heddles 10 is accomplished according to a weave repeat of the threads in such a manner that in a first step a shed 3 is formed in such a manner that a first groups of warp threads 4a lies at the top whilst a second group of warp threads 4b lies at the bottom; then a weft thread 5 is inserted through the open shed 3 (for example by shooting through a shuttle or inserting with the aid of a gripper device or with the aid of air). The freshly inserted weft thread 5 is then beaten by the weft-thread beat-up device 1 along a weft thread beat-up line 12 extending transversely to the warp threads 4 against the already woven fabric 7; after this, the relative positions in relation to the heddles 10 are changed so that a first group of warp threads 4a now lies at the bottom whereas another second group of warp threads 4b lies at the top (not shown); after this a weft thread 5 is again inserted into the shed 3 and beaten by the weft-thread beat-up device 1 and so on.

In FIG. 1 the weft-thread beat-up device 1 substantially has two main assemblies: this is on the one hand the batten 13 which is pivotably mounted on the batten axis of rotation 14. Furthermore, the weft-thread beat-up device 1 has a reed 17.

The reed 17 has an elongate structure which in the present example has a longitudinal axis LA1 which extends substantially parallel to the weft thread beat-up line 12 (i.e. perpendicular to the plane of the drawing in FIG. 1). In the present example, the batten 13 also has an elongate structure; this has a longitudinal axis LA2 which also extends substantially parallel to the weft thread beat-up line 12.

It should be pointed out that a "weft-thread beat-up device" in the sense of the present invention need not necessarily—like the weft-thread beat-up device 1 according to FIG. 1—comprise a reed (like the reed 17) and also a batten (like the batten 13). In the sense of the present invention, for example, a reed or a batten or a reed and a batten, wherein in this last case the reed is fastened to the batten, are also deemed to be a "weft-thread beat-up device". A "weft-thread beat-up device" in the sense of the present invention can at least usually be configured as an elongate structure with a longitudinal axis which extends (like the longitudinal axes LA1 and LA2) substantially parallel to the weft thread beat-up line 12.

In each weft insertion cycle the batten 13 is moved by means of an actuator (not shown in the present case) between a first position 15 (in FIG. 1 the left position of the weft-thread beat-up device; shown by continuous lines) and a second position 16 (in FIG. 1 shown on the right; depicted by dashed lines) and back into the first position 15. When the weft-thread beat-up device 1 is located in the first position 15 (in this context also called "rear position"), a weft thread 5 can simply be inserted into the open shed 3. In the second position 16 (in this context also called "beat-up position"), the reed 17 on the other hand is "on beat-up" with the weft thread beat-up line 12. The inserted weft thread 5 is thus beaten onto the already formed woven fabric 7.

As indicated in FIGS. 1-3, the reed 17 has a comb-like structure and has a plurality of so-called dents 18, which extend between a first (upper) collar 24a of the reed 17 and a second (lower) collar 24b of the reed 17, where the ends of the dents 18 are in each case fastened to the collar 24a or to the collar 24b by adhesive (only shown in FIGS. 2 and 3). In this case, the first collar 24a and the second collar 24b are held together by means of two end dents 24c which each connect one end of the first collar 24a to one end of the second collar 24b in such a manner that the first collar 24a, the second collar 24b and the end dents 24c jointly form a stable frame.

As can be seen from FIG. 3, the dents 18 are disposed consecutively in a row in the direction of the longitudinal axis LA1 of the reed 17 in such a manner that the dents 18 each extend parallel to one another (in the direction of the coordinate axis Y depicted in FIG. 3) and a passage 18a for warp threads 4 is formed between respectively two adjacent dents 18, where each of the passages 18a extends between the first collar 24a and the second collar 24b and each is passable for at least one warp thread 4 (in particular in a direction perpendicular to the plane of the drawing shown in FIG. 3). The warp threads 4 are usually guided through the passages 18a between the individual dents 18 according to a repeat of draw transversely to the longitudinal axis LA1 (the structure of the reed 17 can be seen particularly well in FIG. 3).

The reed 17 is connected via a suitable holder 19 to the batten 13 (the holder 19 is designed as part of the batten 13).

In the present example, the camera arrangement 6 has a plurality of camera apparatuses 20 which are arranged consecutively in a row (along a direction which in FIG. 1 runs perpendicularly to the plane of the drawing so that in the view according to FIG. 1, a camera apparatus 20 shown in the foreground in each case covers all the camera apparatuses 20 arranged behind this and in FIG. 1 only one of the camera apparatuses 20 can be identified). The camera arrangement 6 is (or the camera apparatuses 20 each pertaining to the camera arrangement 6 are) connected to the reed 17 via a support 21 and in particular fastened to the reed 17. In the exemplary embodiment shown the support 21 is part of the camera arrangement 6 and is mobile with the reed 17 and the batten 13 during the weaving process.

As indicated in FIG. 1, the camera apparatuses 20 are disposed on one side of the reed 17, in the present example on that side of the reed 17 which is facing the weft thread beat-up line 12 or on which the "beat-up point" of the reed 17 lies (i.e. that region of the reed 17 which impinges upon the weft thread beat-up line 12 when the weft-thread beat-up device 1 reaches the beat-up position 16). This means for the case that the reed 17 is configured as an air reed (for use in an air weaving machine), the camera apparatuses 20 are disposed in the side of the reed 17 on which the dents of the reed 17 can preferably be fitted with certain mouldings (to form an air channel for transport of weft threads 5 in a direction parallel to the weft thread beat-up line 12 by means of an air flow, not shown).

Each camera apparatus 20 is configured to record an image of arbitrary objects which are located in the so-called image region of the camera apparatus 20 (i.e. in that spatial region which can be shown on an image recorded by means of the camera apparatus 20). Each camera apparatus 20 is configured to record an image in a digital representation which comprises a plurality of pixels which can be arranged either one-dimensionally (e.g. linearly consecutively in a row or column) or two-dimensionally (linearly consecutively in two dimensions, i.e. in several rows and columns). In this case, one or more parameters recorded during recording of an image are usually assigned to each pixel, which parameters contain image information assigned to the respective pixel (e.g. information about a brightness or a light intensity or colour information). The entirety of this image data acquired during the recording of an image, assigned to the respective pixels forms image data which can be used to analyze a recorded image.

In the present example, it is assumed that each camera apparatus 20 is suitable for recording images which are presented in a two-dimensional arrangement of pixels with a plurality of rows and columns. A plurality of pixels can each be arranged consecutively in a row in the longitudinal direction of the reed.

In FIGS. 1 and 3 the image regions 22 of the camera apparatuses 20 shown in each case are shown schematically (each image region 22 in the present example approximately has the shape of a cone and is shown by several lines in FIGS. 1 and 3 which show a projection of the corresponding cone onto the plane of the drawing in FIG. 1 or 3). As FIGS. 1 and 3 indicate, the image regions 22 of the camera apparatuses 20 are arranged in such a manner that an image recorded with one of the camera apparatuses 20 can usually show a part of a plurality of threads, for example sections of a plurality of warp threads 4 or sections of a plurality of warp threads 4 together with a section of a weft thread 5 or a section of a woven fabric 7 comprising a plurality of warp threads 4 and weft threads 5.

As shown in FIG. 1, at least a part of the plurality of dents 18 is located at least partially in the image region 22 of one of the camera apparatuses 20. Preferably each dent 18 of the reed 17 is located in at least one image region 22 of one of the camera apparatuses 20 of the camera arrangement 6. As indicated in FIG. 1, the image region 22 of a camera apparatus 20 extends (in a projection onto the image plane of FIG. 1) in each case along the dents 18 from the camera apparatus 20 as far as the warp threads 4 or the weft thread 5 or the woven fabric 7. As can be clearly seen in FIG. 1, as a result of the mechanical connection between the camera arrangement 6 and the reed 17, the camera arrangement 6 moves together with the batten 13 and with the reed 17 (these form the weft-thread beat-up device 1 as a common unit). For this reason, the respective image region 22 also moves so that a larger region of the shedding zone and a certain partial region of the already finished woven fabric 7 can be swept by the camera arrangement 6 in the warp thread direction and images of the aforesaid regions of the shedding zone and the woven fabric can be recorded with the camera apparatuses 20 of the camera arrangement 6. It is certainly not possible that the entire swept region is recorded simultaneously by the camera apparatus 6 at an arbitrary time. Following a movement between first position 15 (rear position) and second position 16 (beat-up position) or second position 16 and first position 15, however the entire region of the weaving machine 2 is swept, which is accessible to a visual inspection by means of the camera arrangement 6 and accordingly can be monitored with the camera arrangement 6 ("monitoring region") (i.e. in each case after a "half movement period of the batten"). If the "recording time" is correlated with the position of the batten 13 (which can be determined, for example, via an additional position sensor or via the triggering of the actuator which moves the batten 13), it is possible to assign to each recorded image a position information in relation to a coordinate axis extending parallel to the warp thread direction so that it can always be determined with great precision which longitudinal sections of the warp threads 4 are shown on the respective image.

As in particular FIG. 1 indicates, the camera arrangement 6 is mounted on the reed 17 in such a manner that at least a part of the dents 18 appears on all the images recorded with the camera apparatuses 20 (regardless of the instantaneous position of the weft-thread beat-up device 1). If on the other hand, the weft-thread beat-up device 1 is located at the beat-up position 16 or at least in the vicinity of the beat-up position 16 (for example in the last 20% of the movement of the batten 13 from the rear position to the beat-up position and/or in the first 20% of the movement of the batten 13 from the beat-up position to the rear position), in each case a section of the woven fabric 7 extending along the beat-up line 12 appears on the recorded images where in particular an edge of this woven fabric section delimited by the beat-up line 12 appears on these images.

With reference to FIG. 1, it should furthermore be pointed out that the weaving machine 2 has at least two expander elements 7a which are each disposed in the vicinity of the weft thread beat-up line 12 on respectively (in relation to the longitudinal direction of a weft thread 5) opposite edges of the woven fabric 7 and have the function of acting on the woven fabric 7 at these opposite edges of the woven fabric 7 in such a manner that the width of the woven fabric—relative to the longitudinal direction of the weft thread 5—has a predefined value within certain tolerances (in FIG. 1 only one of these expander elements 7a is shown where the other expander element is not visible in the view according to FIG. 1). As indicated in FIG. 1, the one expander element 7a shown then lies at least in an image region 22 of one of the camera apparatuses 20 of the camera arrangement 6 when the weft-thread beat-up device 1 is located at the second position 16 (beat-up position) or at least in the vicinity of the beat-up position 16. Thus, images of one of the expander elements 7a and one section of the woven fabric 7 in the surroundings of this expander element 7a can be recorded at least with one of the camera apparatuses 20 so that in this way it is also possible to monitor the function of the expander elements 7a.

FIG. 2 shows a part of the monitoring device 100 in an enlarged view in schematic cross-section in more detail so that details of the camera arrangement 6 and in particular details of an individual camera apparatus 20 can be identified more clearly.

The support 21 of the camera arrangement 6 is configured as a substantially U-shaped profile 23 which embraces the first (upper) collar 24a of the reed 17. Regularly arranged connecting screws 25 are used for non-positive connection, which screws each pass through a through hole 26 in a region of the profile 23 of the support 21 and engage in a blind hole 27 provided with a thread in the first (upper) collar 24a of the reed 17. On the side of the first collar 24a opposite the connecting screw 25a, a vibration damping device 28 is furthermore formed between the first collar 24a and the relevant region of the profile 23 of the support 21 or the camera apparatus 20. In the present example, the vibration damping device 28 comprises a rubber sheet 28a which is clamped between the first collar 24a of the reed 17 and the profile 23 and is used for absorption of shocks and vibrations. During movement of the weft-thread beat-up device 1 vibrations occur in each case and on reaching one of the two end positions 15, 16 (in particular the second position 16 in which the reed 17 beats against the weft thread beat-up line 12) a certain shuddering occurs. The rubber sheet 28a damps these vibrations and this shuddering which results in a significant increase in the lifetime of the camera arrangement 6 or the camera apparatuses 20. The mechanical connection between the support 21 and the reed 17 is releasable so that the support 21 fitted with the camera apparatuses 20 can be fastened on another reed.

It can furthermore be seen from FIG. 2 that the monitoring device 100 comprises a device 29 for adjusting the position of at least one camera apparatus 20 relative to the weft-thread beat-up device 1 (hereinafter called "adjusting device"). In the present case, the adjusting device 29 comprises a plurality of regularly arranged adjusting screws 29a which can be seen in FIG. 2 in an upper region of the profile 23 of the support 21. Each adjusting screw 29a extends parallel to the longitudinal direction of the bents 18 (i.e. in the direction of the coordinate axis Y shown in FIG. 2). The end of each adjusting screw 29a is in this case supported on the first collar 24a of the reed 17. After releasing the connecting screws 25, the adjusting screws 29a can be turned further in or out (a thread corresponding to the adjusting screw 29a is formed in the support 21) so that the camera apparatuses 20 can be moved upwards and downwards (relative to the position shown in FIG. 2 in each case parallel to the longitudinal direction of the dents 18 or in the direction of the coordinate axis Y shown in FIG. 2) so that the position of each camera apparatus 20 can be adjusted precisely relative to the warp or weft threads 4 or 5 and the woven fabric 7.

As FIG. 2 indicates, each camera apparatus 20 comprises an image sensor 31 with an arrangement of light-sensitive sensor elements which are used for the electronic acquisition of an image to be recorded with the camera apparatus 20 or for the digital representation of an image to be recorded with the camera apparatus 20 having a plurality of adjacently disposed pixels. The image sensor 31 can, for example, be implemented as a CCD or CMOS sensor or optionally on the basis of other light-sensitive sensor elements.

Figure 8:
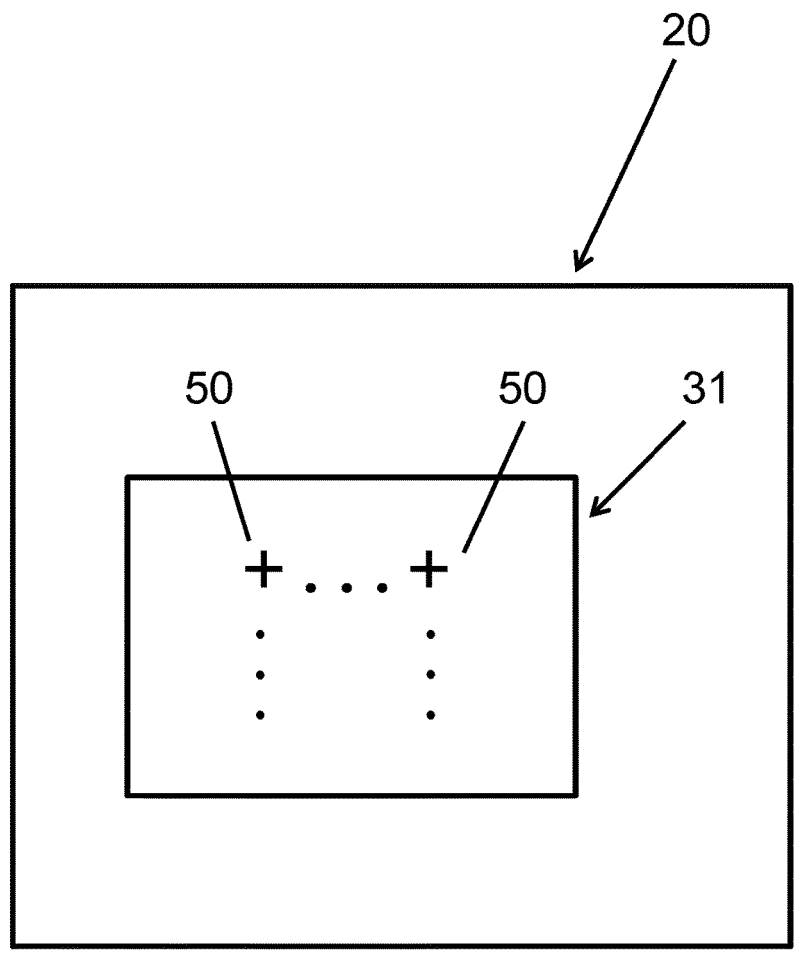
FIG. 8 shows a schematic view of a camera apparatus including an image sensor including a plurality of sensor elements.

The image sensor 31 can comprise a two-dimensional arrangement of sensor elements 50 at locations (+) as schematically shown in FIG. 8. The two-dimensional arrangement can, for example, be configured in such a manner that the sensor elements 50 are arranged on the image sensor 31 in the form of a regular two-dimensional grid. The sensor elements 50 can, for example, be arranged on grid points of a two-dimensional rectangular grid. In this case, the sensor elements 50 can each be disposed adjacently or consecutively in one or more rows. The sensor elements 50 can be arranged in such a manner that at least a plurality of sensor elements 50 are each disposed consecutively or adjacently in a row which extends substantially in the direction of the coordinate axis Z shown in FIG. 3 (i.e. substantially perpendicular to the coordinate axis X show in FIG. 2 and perpendicular to the coordinate axis Y shown in FIG. 2). Accordingly, a plurality of sensor elements 50 can each be arranged consecutively or adjacently in a row which extends substantially in the direction of the coordinate axis X shown in FIG. 2. Such a two-dimensional arrangement of sensor elements 50 of the image sensor 31 ensures that the image sensor 31 delivers a two-dimensional representation of the recorded image (with "rows" or "columns" of pixels which can extend, for example along the coordinate axis Z or the coordinate axis X). In this case, each sensor element corresponds to a pixel of the recorded image.

As can be seen from FIG. 2, each camera apparatus 20 is fitted with an optical lens 32 which serves to produce an optical image of an object to be monitored by means of the camera apparatus 20 (in this case, an optical image of the warp or weft threads 4 or 5 and of the woven fabric 7) and to image it—as sharply focussed as possible—on the image sensor 31. In the present case, the focussing can be influenced whereby the position of each camera apparatus 20 can be adjusted precisely relative to the warp or weft threads 4 or 5 and the woven fabric 7 by means of the adjusting device 29 (as mentioned). Alternatively, it would naturally also be feasible to provide each camera apparatus 20 with a suitable device which enables a distance between the lens 32 and the image sensor 31 to be varied.

In the present case, it is expedient for example to adjust the focussing of the lens 32 in such a manner that the lens 32 produces an (optimally) sharp image of the woven fabric 7 on the image sensor 31 when the weft-thread beat-up device 1 is located in the vicinity of the second position 16 (beat-up position).

As can be further seen from FIG. 2, each camera apparatus 20 can be provided with a protective glass 33 to protect the image sensor 31 and the lens 32 in order in particular to avoid deposits of dust on the image sensor 31 and the lens 32. In order to prevent such dust deposits particularly efficiently, further measures are feasible, for example, a permanent ionization of the ambient air (to prevent electrostatic charging of certain materials, e.g. of glass) or a device for a permanent air flushing.

As can be seen from FIG. 3, the camera arrangement 6 of the monitoring device 100 comprises a plurality of camera apparatuses 20 where the respective camera apparatuses 20 are arranged linearly in a row consecutively along the direction of the longitudinal axis LA1 of the reed 17 and substantially parallel to the weft thread beat-up line 12.

The monitoring device 100 according to FIGS. 1-3 preferably has a modular structure and in the present case comprises a plurality of modules. Each of the modules comprises—as a support for all the components contained in the respective module—a board 30. As can be seen from FIG. 3, all the boards 30 of the monitoring device 100 are each arranged consecutively along the direction of the longitudinal axis LA1 of the reed 17 and fastened to the support 21.

Each module usually comprises (as can be seen from FIGS. 2, 3 and 6):

a plurality of camera apparatuses 20 for recording images, at least one lighting device 39 for illuminating the image regions 22 of the respective camera apparatuses 20 of the module and a data acquisition and evaluation unit 36.

At the same time the data acquisition and evaluation unit 36 can each comprise a plurality of functional elements e.g.

a control and processing unit KM, and/or a fast local memory SM, e.g. a RAM memory (random access memory) which is in communication with the control and processing unit KM and/or a synchronizing unit SE.

The control and processing unit KM of the respective module can be configured, for example, as a FPGA circuit ("field programmable gate array") and is in communication in particular with the camera apparatuses 20 of the respective module in order, for example, to trigger the camera apparatuses 20 of the respective module, for example, in order to cause the camera apparatuses 20 to record an image or in order to perform a processing of the images recorded by the camera apparatuses 20 of the module.

The memory SM of the respective module is used for storing dynamic data, e.g. for unprocessed image data (raw data) which represent an image recorded by a camera apparatus 20 or parts of such an image and/or for processed image data such as, for example results or intermediate results of calculations which are made by the control and processing unit KM, for example, for a processing of recorded images.

The synchronizing unit SE of the respective module is configured to synchronize each camera apparatus 20 of the respective module with a movement position of the weft-thread beat-up device 1 in order to control each camera apparatus 20 as a function of a movement position of the weft-thread beat-up device 1. For this the synchronizing unit SE requires information about the instantaneous position of the weft-thread beat-up device 1 and, for each camera apparatus 20 of the respective module, information about the desired positions of the weft-thread beat-up device 1 at which images are to be recorded in each case in the respective weft thread insertion cycles.

As can be seen from FIG. 3, the modules of the monitoring device 100 are designed in such a manner that they can be different. The monitoring device 100 can, for example, have a plurality of identically configured modules M0 (so-called "base modules" M0) which for example can have 8 camera apparatuses 20 and are identical with regard to their functionality. The monitoring device 100 can additionally have a module ME (so-called "end module") which has an "extended functionality" compared with the modules M0 and is disposed at the end of the reed 17. As can be seen from FIG. 3, all the modules M0 and the module ME are interconnected via (data) connections 38a in order to enable a communication of data. In the present example, respectively two adjacent modules M0 are interconnected in series via a connection 38a (e.g. via electrical cable connections or light guides) so that all the modules M0 are connected in series via the connection 38a. Furthermore, one of the modules M0 is connected to the module ME so that all the modules M0 can communicate with the module ME via connections 38a. The module ME in the present example—in contrast to the modules M0—is fitted with a data transmitting device which can communicate with a control device 37 of the weaving machine 2 by means of a wireless data transmission 38, e.g. according to a "near field communication" standard (NFC). On account of the connections 38a between the modules M0 and ME and the wireless data transmission 38 between the module ME and the controller 37 of the weaving machine 3, accordingly all the modules M0 can communicate with the controller 37 of the weaving machine under control of the module ME and optionally exchange data. Furthermore, the control and processing unit KM of the module ME can take over the function of a "main processing unit" (master processing unit) and in this function transmit data or control signals to the modules M0 in order to control the modules M0. Further examples for the "extended functionality" of the module ME are explained hereinafter in connection with FIG. 6.

As can be deduced in particular from FIG. 3, the individual camera apparatuses 20 are arranged in such a manner spaced apart from one another on the board 30 (or the boards 30) that the respective image regions 22 of two adjacent camera apparatuses 20 overlap in some regions in the direction of the longitudinal axis LA1 of the reed 17. In order to illustrate these facts, an overlap region U extending in the direction of the longitudinal axis LA1 is given for two adjacent camera apparatuses 20, which characterizes the extent of the overlap of the image regions 22 of these two adjacent camera apparatuses 20 (the extension of the overlap region U along the longitudinal axis LA1 is given by a double arrow in FIG. 3). If the boards 30 are arranged on the reed 17, certain regions of the warp threads 4 or the woven fabric 7 which are located in the aforesaid overlap region U of the image regions 22 of two adjacent camera apparatuses 20 consequently appear on images of these two camera apparatuses 20 and can therefore be monitored "simultaneously" by these two camera apparatuses 20. In this way, "blind spots" can advantageously be avoided so that a particularly high inspection quality of the weaving machine 2 can result. This overlap is administered with an already mentioned calibration.

As can be seen from FIG. 3, the camera apparatuses 20 of the camera arrangement 6 are arranged consecutively in such a manner that the entirety of all the image regions 22 of the camera apparatuses 20 extend in a direction parallel to the weft thread beat-up line 12 over a distance Ref which is greater than or equal to the length of the longitudinal sections of the reed 17 in which the passages 18a for the warp threads 4 are formed. The aforesaid longitudinal section of the reed 17 clearly has a length B (characterized by a corresponding double arrow B in FIG. 3) which corresponds to the maximum width of the warp which is guided by means of the reed 17. Accordingly with all the camera apparatuses 20 of the camera arrangement 6, it is possible to monitor the entire width of the woven fabric 7 which can be produced by means of the reed 17 and the entirety of all the warp threads 4 which can be guided through the passages 18a.

It is possible that the image processing of the recorded images is accomplished substantially completely by the data acquisition and evaluation units 36 which are formed jointly with the camera arrangement 6 on the reed 17. Likewise however, it is also possible that merely one pre-evaluation is made, for example, a preliminary reprocessing in order to detect only specific weaving defects, a use of data compression algorithms and the like.

As already mentioned, each module M0 or ME comprises at least one lighting device 39 for illuminating the image regions 22 of the respective camera apparatuses 20 of the module M0 or ME. As indicated in FIG. 2, the lighting device 39 of each module M0 or ME comprises light-emitting diodes 39a (LEDs) which are arranged in two rows in each case linearly in the direction of the longitudinal axis LA1 in each case consecutively on each board 30 in such a manner that the image regions 22 of the camera apparatuses 20 disposed on the board 30 are illuminated. The light-emitting diodes 39a can advantageously be various types of light-emitting diodes 39a, for example, red, green, blue and infrared light-emitting diodes 39a. In this way, an extremely large range of potential weaving defects can be detected. The light-emitting diodes 39a can at the same time be energized with current (for example, white light as far as into the infrared) but also successively triggered one after the other so that at certain times different light colours are emitted onto the warp threads 4 or weft threads 5 or the woven fabric 7. The light produced by the light-emitting diodes 39a is guided in the present case via glass fibre conductors 40 from the light-emitting diodes 39a to the housing edge of the camera apparatus 20. By this means a focussing and emission direction suitable for the respective purpose can be achieved.

In particular, it is also possible to selectively trigger the light-emitting diodes 39a in such a manner that these illuminate a certain area of the woven fabric 7 or the warp threads 4. Such a triggering can be accomplished if the data acquisition and evaluation unit 36 and/or the controller 37 have determined a serious defect which justifies a discontinuance of the weaving process of the weaving machine 2. In this case, the weaving process is stopped and the light-emitting diodes 39a are triggered in such a manner that the region in which a defect has occurred is illuminated. In this way, it is immediately intuitively identifiable for the machine operator where a defect has occurred and where he must in particular take defect-eliminating measures. For this reason a bidirectional (wireless) data transmission 38 is expedient between the data acquisition and evaluation unit 36 and the controller 37.

As can be seen from FIG. 3 in particular, the camera arrangement 6 is arranged in such a manner that all the camera apparatuses 20 of the camera arrangement 6, all the lighting devices 39 of all the modules M0 and ME and all the data acquisition and evaluation units 36 are always located outside the shed opening zone of the weaving machine 2 to form a shed 3 (for all positions of the weft-thread beat-up device 1 between the first position 15 and the second position 16). In this case, all the camera apparatuses 20 of the camera arrangement 6 and all the lighting devices 39 are arranged in such a manner on the first collar 24a of the reed 17 that the camera apparatuses 20 do not completely or partially block or restrict any of the passages 18a (with respect to a guidance of warp threads through the passages 18a). For the same purpose the camera arrangement 6 could accordingly be arranged on the second collar 24b so that the camera arrangement 6 always remains outside the shed opening zone of the weaving machine 2 to form a shed 3 for all positions of the weft-thread beat-up device 1.

Figure 4:
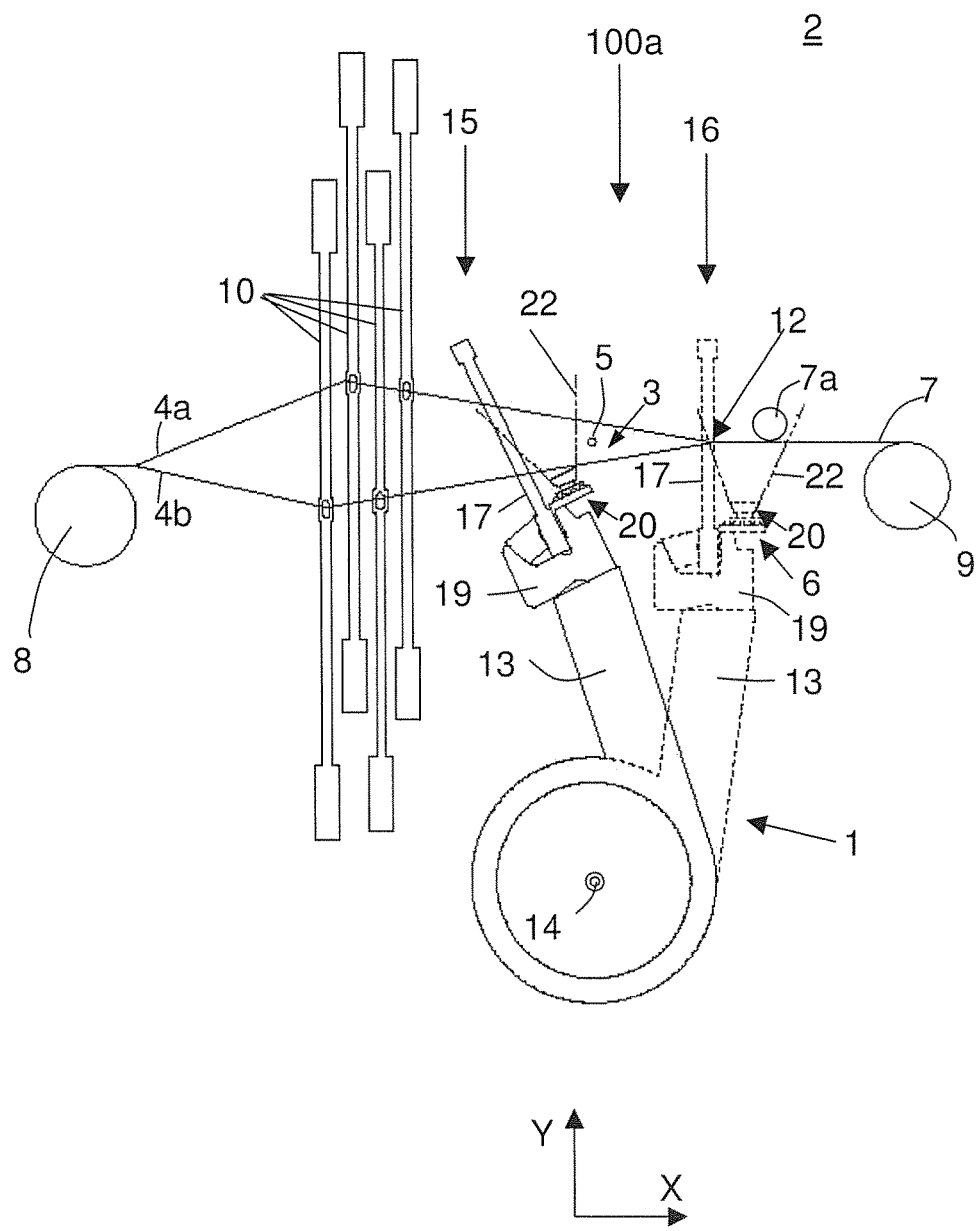
FIG. 4 shows a second feasible exemplary embodiment for a monitoring device with integrated arrangement of camera apparatuses in a schematic cross-sectional view.

FIG. 4 shows a monitoring device 100a which is a variation of the monitoring device 100 shown in FIG. 1. The monitoring device 100a is largely identical to the monitoring device 100 shown in FIG. 1. The essential difference between the two monitoring devices 100a and 100 consists in that in the exemplary embodiment shown in FIG. 4, the respective camera apparatuses 20 are disposed "at the bottom" with respect to the warp threads 4, i.e. adjacent to the batten 13. In the case of the monitoring device 100a, the camera arrangement 6 formed from the camera apparatuses 20 is fixed on the profile-like holder 19 of the batten 13 which (also) serves for fastening the reed 17.

Otherwise, structure and mode of operation of the monitoring devices 100 and 100a according to FIG. 1 and FIG. 4 largely correspond to one another which is why reference is made to the previous explanations. In particular, it should be obvious for a person skilled in the art that the vibration damping device 28 disclosed in connection with the monitoring device 100 according to FIG. 2 and the adjusting device 29 for adjusting the position of the camera apparatus 20 relative to the weft-thread beat-up device 1 can also be installed in a similar manner in the monitoring device 100a.

For the sake of completeness, it should be mentioned that it is naturally also possible to provide the warp threads both "at the top" and also "at the bottom" with respect to camera arrangements 6. By this means both sides of the woven fabric 7 can be inspected so that the quality of the visual inspection of the woven fabric 7 can be further increased.

Figure 5:
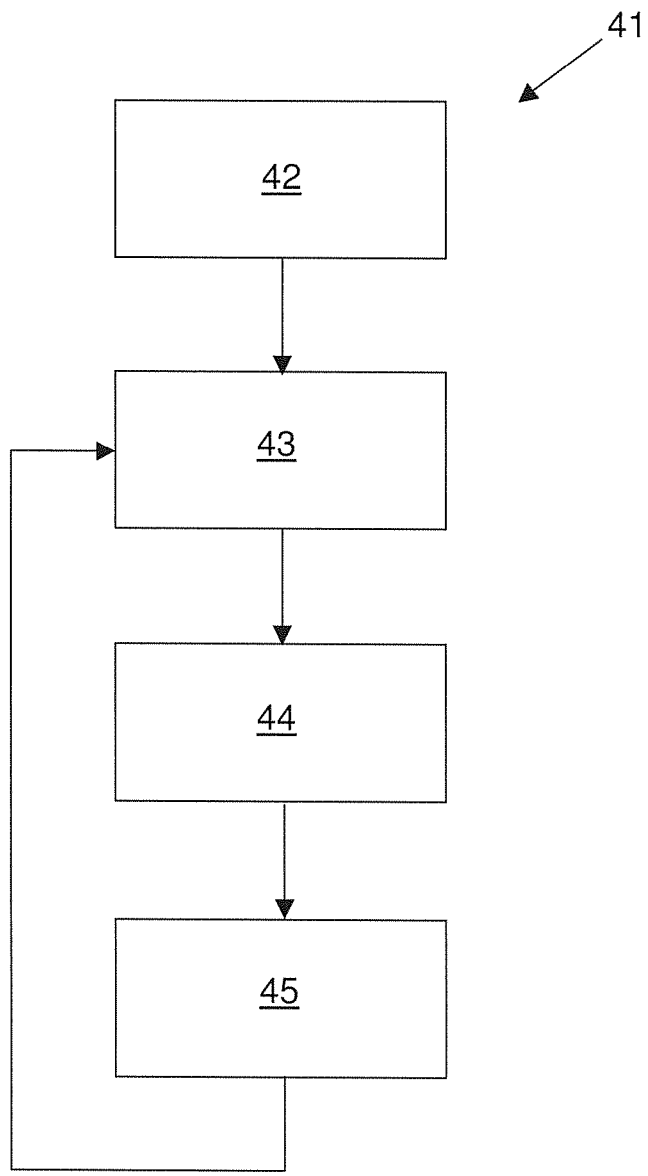
FIG. 5 shows a schematic flow diagram for a method for monitoring a weaving machine.

Finally in FIG. 5 in the form of a schematic flow diagram 41, a method for monitoring at least warp threads 4 in a weaving machine 2 with a camera apparatus 20 for a weaving process is described which weaving machine 2 comprises a movable weft-thread beat-up device 1. In this case, during a movement of the weft-thread beat-up device 1, the camera apparatus 20 is co-moved with the weft-thread beat-up device 1, where the camera apparatus 20 records one image each at at least two different movement positions of the weft-thread beat-up device 1 during a weaving process.

In a first step 42 (for example, at the beginning of a weaving process, for example before a first weft insertion cycle of the weaving process), an assignment of the warp threads is made in which, to each warp thread 4 to be monitored, at least one of the pixels of one of the camera apparatuses 20 is assigned. In order to make this assignment, the image processing device BV requires the information of the repeat of draft and information about the pixels which each correspond to one of the passages 18a for the warp threads 4 in the reed 17. This information about the pixels (corresponding to the respective passages 18a) can be obtained with the mentioned calibration or it can be determined by an analysis of images in which the dents 18 are imaged.

In a second step 43 during the weaving process at least one image is recorded by means of one of the camera apparatuses 20 or images are recorded by means of one or more of the camera apparatuses 20. The time of recording of an image is controlled for each camera apparatus 20 according to a determined position of the weft-thread beat-up device 1 with the aid of the synchronizing unit SE, accordingly the lighting device 39 for illuminating the warp threads 4 or weft threads to be monitored or the woven fabric 7 to be monitored is also controlled with the aid of the synchronizing unit SE—synchronously to the recording of the images. At least one image each is recorded when the weft-thread beat-up device 1 is located in a certain position, e.g. when the weft-thread beat-up device 1 is located in the vicinity of the beat-up position (for monitoring a section of the woven fabric in the vicinity of the weft-thread beat-up line) and when the weft-thread beat-up device 1 is located in the rear position.

In step 43 image data which are delivered by the camera apparatuses 20 are read into a data processing device. In addition, further sensor data is read in (such as, for example, data of a sensor which determines the instantaneous position of the weft-thread beat-up device 1).

The data thus obtained is analyzed and reprocessed in a step 44. The data acquisition and evaluation unit 36 is used for this purpose. The reprocessing of the data is accomplished in a position-dependent manner (where the position can relate both to a position in the direction of the warp threads 4 and also to a direction transversely to the woven fabric 7 or parallel to the weft threads 5). The reprocessing of the data depends on the position of the weft-thread beat-up device 1, in which the image corresponding to this data is recorded because not all weaving defects are taken into account in a single position of the weft-thread beat-up device 1. The reprocessing of the data furthermore depends on the respective weft number because weaving defects such as an incorrect warp thread colour or fly spots on the woven fabric 7 are not taken into account for all weft insertion cycles. Warp thread breaks are monitored in each weft insertion cycle with the aid of an image, which is recorded when the weft-thread beat-up device 1 is located in the rear position, and with the aid of one or more further images, which are recorded when the weft-thread beat-up device 1 is located in an intermediate position between the beat-up position and the rear position.

The aforesaid analysis and reprocessing of the data can be obtained from a comparison of the images recorded during a monitoring by means of the camera apparatuses 20 with already existing (stored) image data, in particular image data which was obtained during a phase of start of weaving before the weaving process or image data stored in a database. This analysis and reprocessing requires input data which characterize the weaving process to be monitored, e.g. weft thread density, position of weft-thread beat-up device 1, number of weft thread just woven in, weave repeat, repeat of draw, limiting values for each weaving defect before a weaving machine stoppage. Such input data can be stored, for example, in a memory of the module ME.

The data thus reprocessed are evaluated in an evaluation step 45 as to whether a weaving defect is present or not. Particularly in order to enable the localization of a weaving defect in relation to a coordinate axis extending in the longitudinal direction LA1 of the reed 17, the assignment made in step 42 is used. Steps 43, 44 and 45 are conducted within the weft insertion cycle in which the images are recorded so that correcting measures (as a response to a weaving defect) can be made the fastest. Weaving defects are therefore detected in real time, the type of defect is determined and the defective weaving element (warp thread No. k, weft thread No. s, location of a defect in the woven fabric zone and similar) are notified.

Depending on the "severity" of the defect, an output signal is effected in such a manner (for example, to a or from a controller 37) that the weaving process is suitably modified so that the defect which has occurred is reduced or substantially eliminated. However, it is also possible that the weaving process of the weaving machine 2 is stopped so that a machine operator can eliminate the defect (in particular a defect which cannot be eliminated in an automated manner or can only be eliminated with difficulty such as, for example, a warp thread break).

The cycle then begins with a renewed recording of images (step 43).

The method can naturally be used in connection with arbitrary devices. The reference numbers of the exemplary embodiments shown in FIGS. 1 to 4 were only used for reasons of understandability.

Figure 6:
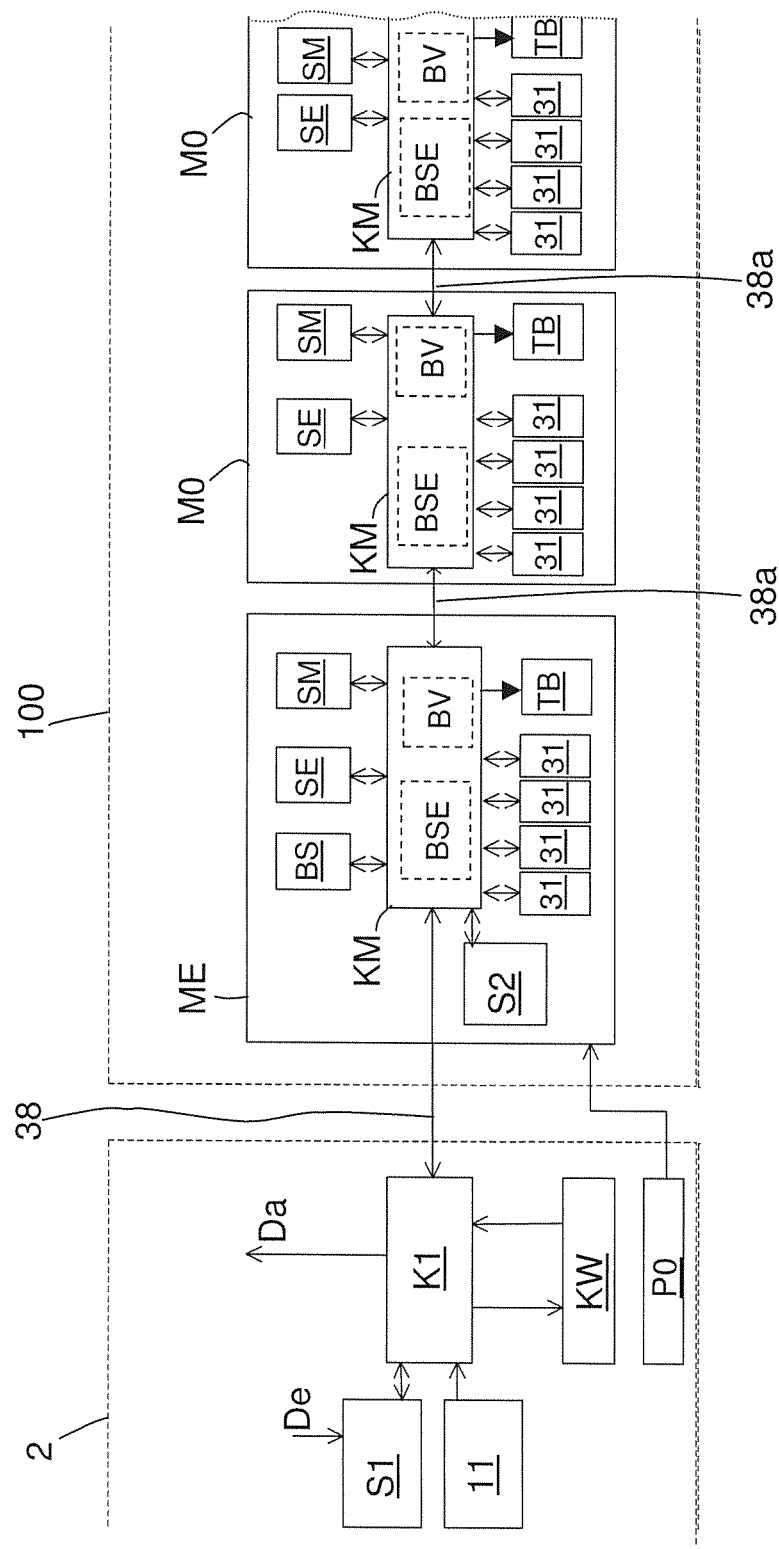
FIG. 6 shows a schematic view of a control of the monitoring device and a weaving machine according to FIG. 1.

With reference to FIG. 6, an example for a control of the monitoring device 100 according to FIGS. 1-3 in combination with a control of the weaving machine 2 is described schematically hereinafter for the case where the threads 4, 5 and the woven fabric 7 of the weaving machine 2 is monitored by means of the monitoring device 100. FIG. 6 shows schematically relevant functional elements of the weaving machine 2 and relevant functional elements of the monitoring device 100. Arrows or double arrows shown in FIG. 6 symbolize either a communication of data or signals (e.g. for the control and/or for the transmission of information) or a provision of energy (power supply or voltage supply in order to operate electrical devices).

As FIG. 6 indicates, the weaving machine 2 for example comprises the following functional elements:

a device P0 for energy supply which is intended to supply at least the weaving machine 2 with energy and to which the monitoring device 100 can be connected to operate the weaving machine 2 in combination with the monitoring device 100;

a control device KW for controlling the operation of the weaving machine 2;

a control device K1 for controlling a communication between the weaving machine 2 and the monitoring device 100 and possibly for processing data which can be produced by the monitoring device 100;

a memory S1 for input data De which are provided for the control device K1 and optionally required by the monitoring device 100; and a shedding device 11 which has already been described in connection with FIG. 1.

As can be seen, the control device KW is in communication with the control device K1 for exchange of data (e.g. bidirectionally).

The control device K1 is in communication with the shedding device 11 and the memory S1 for input data De for exchange or for transmission or for receipt of data. In this way, the control device K1 receives information from the shedding device 11 (e.g. via warp thread positions or information relating to the weave repeat of a woven fabric 7 to be produced) or input data De stored in the memory S1. The input data De can, for example, comprise: operating data of the weaving machine 2 (e.g. weft thread sequence, weft density, position of the weft-thread beat-up device 1), data of a drawing-in machine for drawing-in a warp into the reed 17 (repeat of draw), specifications of an operator of the weaving machine 2 (e.g. desired values for specific weaving defects, limiting values for operating parameters which define criteria for a weaving machine stoppage).

As can be further seen from FIG. 6, the control device K1 has the task of producing output data Da. This output data Da relates in particular to a communication of weaving defects (as a result of a monitoring of the weaving machine 2 by means of the monitoring device 100).

As is further indicated in FIG. 6, the monitoring device 100 comprises as relevant functional elements a plurality of modules M0 ("base module") and a module ME (end module) which have already been mentioned in connection with FIGS. 2 and 3. As has already been mentioned in connection with FIGS. 2 and 3, each of the modules M0 and the module ME in particular comprises the following components: a plurality of camera apparatuses 20 for recording images, at least one lighting device 39 for illuminating the image regions 22 of the respective camera apparatuses 20 and—as components of the data acquisition and evaluation unit 36—in each case a control and processing unit KM, a fast local memory SM and a synchronizing unit SE. All these components are disposed on the reed.

In order to illustrate these facts, it is shown in FIG. 6 that the operation of each module M0 or ME is controlled by the corresponding control and processing unit KM. For this purpose, according to FIG. 6—both in the case of each module M0 and the module ME—the control and processing unit KM of the respective module M0 or ME is in communication with a plurality of image sensors 31 of a plurality of camera apparatuses 20, a memory SM and a synchronizing unit SE.

In addition, according to FIG. 6—both in the case of each module M0 and the module ME—the respective control and processing unit KM is in communication with a driver TB for the lighting device 39 (or the light-emitting diode 39a of the lighting device) of the respective module M0 or ME. In this way, it is ensured that the control and processing unit KM of the respective module M0 or ME can trigger the lighting device 39 of the respective module M0 or ME in order in particular to switch on or off the respective light-emitting diode 39a as required.

The control and processing unit KM of the respective module M0 or ME can in particular control a time at which the respective light-emitting diode 39a is switched on in order to produce light and furthermore a time duration during which the respective light-emitting diode 39a should produce light. The control and processing unit KM of the respective module M0 or ME can in this way ensure that the lighting device 39 of the respective module M0 or ME in particular produces light when a camera apparatus 20 of the respective module M0 or ME should record an image so that provision is made for a prompt illumination of the image region 22 of the camera apparatus 20.

As FIG. 6 further indicates, the control and processing unit KM of the respective module M0 or ME comprises an image processing device BV which is configured to process and analyze the images which are recorded by means of the image sensors 31 of the camera apparatuses 20 of the respective module M0 or ME or the image data provided by the image sensors 31, which correspond to the respectively recorded images.

As already mentioned, the control and processing unit KM of the module ME has the function of a "main processing unit" (master processing unit) which can transmit data or control signals to the control and processing units KM of the module M0 and receive data from the control and processing units KM of the modules M0. For the transmission of data or control signals the control and processing units KM of the modules M0 are serially interconnected by means of the connections 38a, wherein the control and processing units KM of one of the modules M0 is connected to the control and processing unit KM of the module ME via a connection 38a (FIG. 6).

As can be seen from FIG. 6, data or signals can be transmitted between the control and processing unit KM of the module ME and the control device K1 by means of a wireless data transmission 38. The module ME further comprises a memory S2 to which the control and processing unit KM of the module ME has access. The memory S2 is intended to store various input data which are used by the monitoring device 100 to be able to monitor the warp threads, weft threads and woven fabric on the weaving machine 2. This input data can, for example, comprise information about the drawing-in of warp threads (repeat of draft), the type and arrangement of weaves between warp and weft threads of a woven fabric to be produced by the weaving machine 2, the properties and the state of the reed 17 and the like.

The module ME further comprises a sensor device BS for determining the instantaneous position of the weft-thread beat-up device 1 of the weaving machine 2. The sensor device BS is connected to the control and processing unit KM of the module ME so that the control and processing unit KM of the module ME can optionally use data or signals of the sensor device BS and in this way has information about the position at which the weft-thread beat-up device 1 is located during a weaving process at a certain time. Accordingly the control and processing unit KM of the module ME can control the components of the monitoring device 100 and in particular the modules M0 as a function of the movement position of the weft-thread beat-up device 1. The sensor device BS can, for example be configured as an acceleration sensor which is suitable for determining an acceleration of the weft-thread beat-up device 1 or at least comprise such an acceleration sensor.

The control and processing unit KM of each of the modules ME or M0 can in particular be configured to control the recording of images by means of the camera apparatuses 20 of the monitoring device 100, optionally also as a function of data or signals of the sensor device BS. For this purpose the control and processing unit KM of each of the modules ME or M0 comprises an image control device BSE which is in data communication with the synchronizing unit SE of the module ME or M0 in order to control the time at which a certain camera apparatus 20 of the module ME or M0 should record an image (FIG. 6).

Alternatively it would be feasible that the image control device BSE of the module ME can be configured, for example, to directly trigger the camera apparatuses 20 of the modules MO (not shown in FIG. 6). In order to cause the camera apparatus 20 of the module M0 to record images, the image control device BSE of the module ME can, for example, transmit corresponding control data to the control and processing unit KM of the modules M0. Depending on these control signals, the control and processing unit KM of a certain module M0 can ultimately trigger the camera apparatuses 20 and the lighting device 39a in order to cause these camera apparatuses 20 to record one or more images.

The respective image processing device BV of one of the modules M0 or the module ME can, for example, be configured, using information from the synchronizing unit SE about the recording time of each image, to analyse (for example according to a method as described above) for each image which is recorded by one of the camera apparatuses 20 of the respective module M0 or the module ME, the corresponding raw data provided by the image sensor 31 of the respective camera apparatus 20 as a function of the position of the weft-thread beat-up device 1 in which the respective image was recorded in order to detect a weaving defect. In this way, the image processing device BV of one of the modules M0 or the module ME could, for example, determine whether a warp thread 4 is present in a certain passage 18a of the reed 17 or not and whether the respectively determined result is consistent with the input data which are provided in the memory S2 of the module ME. Should the latter not be the case, this would be an indication that a warp thread break is present in the region of the passage 18a. The data calculated in each case by the image processing device BV can, for example, be stored in the memory SM of the respective module M0 or ME.

Should a complex (optionally requiring a long processing time) analysis of an image be required (this could be the case, for example if an analysis of the colour information contained in a image must be taken into account), it would be possible to relay the raw data provided by the image sensor 31 of the respective camera apparatus 20 and/or the data calculated (on the basis of this raw data) in each case by the image processing device BV to the control device K1 of the weaving machine 2 by means of the wireless data transmission 38. Complex analyses of images could accordingly also be conducted by another image processing device which need not necessarily be disposed in the weft-thread beat-up device 1 but could be integrated for example in the control device K1 or accommodated elsewhere in the weaving machine 2 or could possibly also be disposed at a distance from the weaving machine 2 (if a suitable data transmission is implemented for transmission of the image data to be processed between this other image processing device and the control device K1).

It should be pointed out that the monitoring device 100 need not be adapted so that all the camera apparatuses 20 of the monitoring device 100 each record an image simultaneously. Since each weaving defect cannot be detected on all images of a weft thread insertion cycle and since each weaving defect should not be detected with the same frequency (an image analysis for warp thread break should be conducted at least once per weft thread insertion cycle whilst an image analysis for fly and spots is only conducted for every twentieth weft thread insertion cycle), it can also be expedient that at a specific time point or at a specific position of the weft-thread beat-up device 1, only one camera apparatus 20 or only a part of the entirety of all the camera apparatuses 20 of the camera arrangement 6 is triggered to record an image. For example, it can be sufficient that during a weaving process at one time point only one part of the entirety of all the camera apparatuses 20 of the camera arrangement 6 is triggered to record an image whereas at another time point, another part of the entirety of all the camera apparatuses 20 of the camera arrangement 6 is triggered to record an image in each case. In this way, it is possible to monitor respectively different partial regions of the weaving machine at different times using the monitoring device 100. In this way, it is possible to minimize the number of images to be recorded (and to be analyzed). Since the monitoring device 100 analyzes the recorded images in real time in each case, the processing effort of the control and processing units KM of the modules M0 and the module ME can be reduced in this way.

FIGS. 7A-7D show (drawn) diagrams of various images which can be recorded using a (the same in each case) camera apparatus 20 of the monitoring device 100 according to FIGS. 1-3 for different movement positions of the weft-thread beat-up device 1.

FIGS. 7A-7D show images of the entire image region of the camera apparatus 20.

Figure 7A:
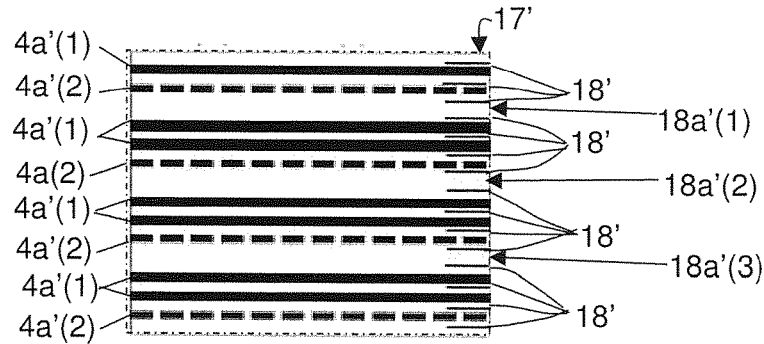
FIGS. 7A-7D show examples for images which are recorded using a camera apparatus according to FIG. 1 but for various positions of a weft-thread beat-up device during various phases of a weft thread insertion cycle.
Figure 7B:
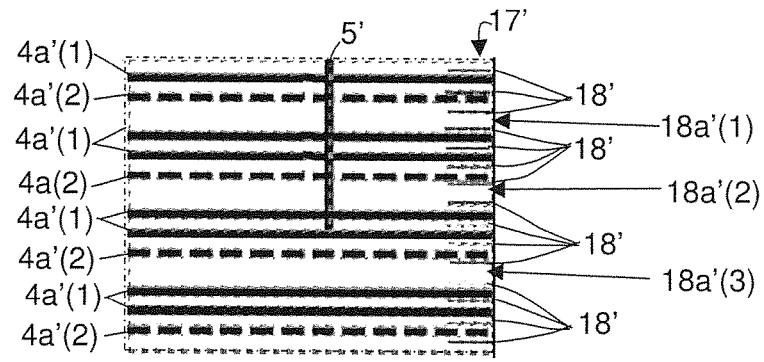

In the case of FIG. 7A, it is assumed that the weft-thread beat-up device 1 is located in the first position 15 (rear position). In the case of FIG. 7B, it is assumed that the weft-thread beat-up device 1 is located in an intermediate position between the first position 15 and the second position 16 (beat-up position). In the case of FIG. 7B, it is assumed that the weft-thread beat-up device 1 is located in an intermediate position between the position according to FIG. 7B and the second position 16 (beat-up position). On the other hand, in the case of FIG. 7D it is assumed that the weft-thread beat-up device 1 is located in the vicinity of the second position 16 (beat-up position). In this case, FIGS. 7A-7D each relate to successive times during the same weft thread insertion cycle.

Figure 7C:
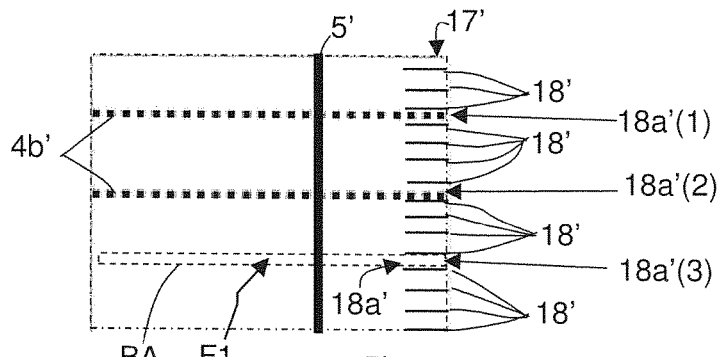
Figure 7D:
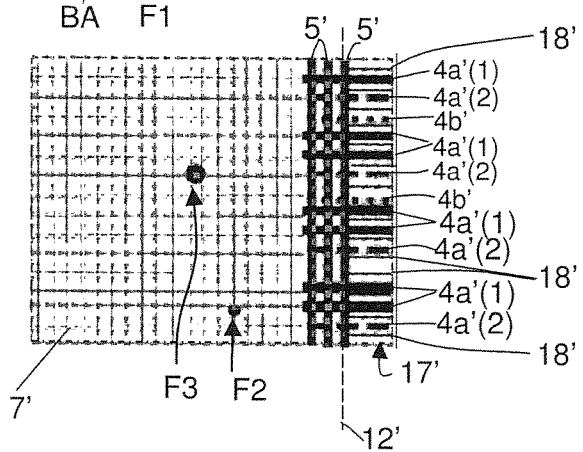

As can be seen from FIGS. 7A-7D, the following are imaged on the various images of the camera apparatus 20:

A section of the reed 17 with a plurality of adjacently disposed dents (in FIGS. 7A-7D the imaged section of the reed 17 is characterized by the reference number 17' and each imaged dent 18 is characterized by the reference number 18');
in each case a section of a plurality of adjacently disposed warp threads 4;
a section of one or a plurality of weft threads 5 with the exception of FIG. 7A, which does not show any weft threads (in FIGS. 7B-7D the imaged section of the respective weft thread 5 is characterized by the reference number 5');
a section of the woven fabric 7 already produced, with the exception of FIG. 7A-7C, which does not show any section of the woven fabric 7 (in FIG. 7D the imaged section of the woven fabric 7 is characterized by the reference number 7').

The images shown in FIGS. 7A-7D correspond to the situation shown in FIG. 1, in which not all the warp threads 4 are spanned in a single plane; in the situation according to FIG. 1, an open shed 3 is formed so that a first group 4a of warp threads is separated from a second group 4b of warp threads in the region of the shed 3 in the longitudinal direction of the coordinate axis Y shown in FIG. 1 and therefore have different distances relative to the camera apparatus 20. In the following it is also taken into account that not all the warp threads 4 are configured identically but differ in such a manner (visually identifiably) that differences can be identified on the images and can be perceived by an image processing of the images by the monitoring device 100 (e.g. when different threads have different colours, different diameters or differently constituted surfaces).

In FIGS. 7A-7D the following notation is used: the reference number 4a'(1) designates an imaged section of a warp thread pertaining to the first group 4a according to a first embodiment; the reference number 4a'(2) designates an imaged section of a warp thread pertaining to the first group 4a according to a second embodiment which differs from the first embodiment (visually identifiably); the reference number 4b' denotes an imaged section of a warp thread pertaining to the second group 4b.

The images shown in FIGS. 7A-7D have the common feature that on all the images—in each case on the right edge and in each case in the same position relative to the right image edge—the imaged section 17' of the reed 17 appears and a plurality of imaged dents 18' (arranged next to one another) are visible. In particular, the passages (for warp threads) formed between the imaged dents 18' are visible. As FIGS. 7A-7D show, the camera apparatus 20 is disposed in such a manner on the reed 17 that the first (upper) collar 24a of the reed 17 is not imaged on any of the images so that all the images allow a free view of the imaged dents 18' and in particular the passages for the warp threads (formed between respectively two of the imaged dents 18'). Accordingly, the images according to FIGS. 7A-7C enable a visual monitoring as to whether the imaged dents 18' are located in an orderly state or possibly have a defect. Furthermore, it can be identified visually through which of the passages between respectively two of the imaged dents 18' one of the imaged sections 4a'(1), 4a'(2) or 4b' is guided.

As can also be seen from FIG. 7A, the camera apparatus 20 is placed relative to the first (upper) collar 24a of the reed 17 in such a manner that on the image according to FIG. 7A a plurality of (adjacently disposed and extending parallel to one another) imaged sections 4a'(1) (represented as a continuous straight line in FIGS. 7A and 7B) and a plurality of (adjacently disposed and extending parallel to one another) imaged sections 4a'(2) (represented in FIG. 7A and FIG. 7B as a multiply interrupted straight line) can be identified. In FIG. 7A in particular no imaged section 4b' can be identified. According to FIG. 7A, at most one imaged section 4a'(1) or one imaged section 4a'(2) appear to extend through each of the imaged passages which are formed between respectively two of the imaged dents 18'. None of the imaged sections 4a'(1) or 4a'(2) extends through three of the imaged passages (these three imaged passages are designated in FIGS. 7A, 7B and 7C by the reference numbers 18a'(1), 18a'(2) or 18a'(3). No weft thread and no woven fabric can be identified in FIG. 7A.

FIG. 7A and FIG. 7B differ in that the weft-thread beat-up device 1 has been moved from the rear position into another position (as mentioned). In the case of FIG. 7B the relative arrangement of the first group 4a of warp thread 4 relative to the reed 17 is the same as in the case of FIG. 7A. The position of the imaged sections 4a'(1) and 4a'(2) is therefore identical in FIGS. 7A and 7B. According to FIG. 7B (in contrast to the situation according to FIG. 7A), a weft thread 5 has been inserted into the shed 3 and is specifically located in a movement through the shed 3 so that on the image according to FIG. 7B one end of an imaged section 5' of a weft thread 5 (in FIG. 7B shown as a continuous line extending from top to bottom) extends under a part of the imaged sections 4a'(1) and 4a'(2) (in each case perpendicular to the imaged sections 4a'(1) and 4a'). As can be seen according to FIG. 7B, the imaged section 5' extends at a distance from the imaged dents 18'.

FIG. 7B and FIG. 7C differ in that between the situation according to FIG. 7B and the situation according to FIG. 7C, the time has progressed and the weft-thread beat-up device 1 has moved further into a different position (as mentioned). The imaged section 5' now extends (from top to bottom) through the entire shed and consequently through the entire image shown in FIG. 7C. On the image according to FIG. 7C, neither of the sections 4a'(1) and 4a'(2) can furthermore be identified which are visible in FIGS. 7A and 7B. Instead on the image according to FIG. 7C, two imaged sections 4b' of warp threads pertaining to the second group 4b are visible (in FIG. 7C shown as dashed lines). As can be seen, these two sections 4b' extend through the imaged passages 18a'(1) or 18a'(2).

FIG. 7C shows a rectangular section BA of the depicted image (an outer edge of this section BA is shown as a dashed line in FIG. 7C) which on the depicted image extends horizontally as far as the right edge of the image and in particular into the imaged passage 18'a(3). As can be deduced from FIG. 7C, no warp thread can be identified in section BA of the depicted image.

Since the information contained in the repeat of draft and the information contained in the weave repeat are available to the image processing device BV, the image processing device BV knows that for this weft thread insertion cycle a warp thread pertaining to the second group 4b can be expected in passage 18a'(3). Under these circumstances a "defect" would be present which can be identified by an image processing of the images shown in FIG. 7C and in addition can be localized with greater accuracy: for illustration in FIG. 7C reference is made with an arrow F1 to the section BA of the depicted image which refers to a defective warp thread and marks the position of this defect. This defect can in particular be assigned to a single passage 18a in the reed 17.

In the situation shown in FIG. 7D, the weft-thread beat-up device 1 is now located in the vicinity of the second position 16 (beat-up position). Accordingly on the image shown in FIG. 7D, a section 7' of the woven fabric 7 is imaged which is delimited on the right side of the image by the weft-thread beat-up line (in FIG. 7D the course of the weft-thread beat-up line is shown by a dashed line with the reference number 12'). Accordingly the imaged section 17' of the reed 17 closely adjoining the line 12' extends substantially parallel to the line 12'. On the right edge of the imaged section 7' of the woven fabric 7, a section 5' of the weft thread is shown (closely adjacent to the line 12', extending substantially parallel to the line 12') which, on the images shown in FIGS. 7B and 7C, has a distance from the imaged section 17' of the reed 17 but on the image according to FIG. 7D, directly adjoins the imaged section 17' of the reed 17 and is conveyed with the reed 17 into a position extending along the line 12'. On the imaged section 7' of the woven fabric 7, two locations with locally delimited weaving defects (e.g. fly or spots on the woven fabric) can be identified which are marked by arrows F2 and F3.

As can be seen, the images shown in FIGS. 7A-7D each enable an image analysis along a direction (at least) substantially parallel to the weft-thread beat-up line 12. Such an image analysis can be performed by means of the image processing described, in particular with the aid of the image processing devices BV described.

What is claimed is:

1. A monitoring device (100, 100a) for a weaving machine (2) which monitoring device comprises at least one camera apparatus (20) and
    a weft-thread beat-up device (1),
    wherein the weft-thread beat-up device (1) comprises at least one of a reed (17) extending in a longitudinal direction (LA1, LA2) of the weft-thread beat-up device (1) and a batten (13) extending in a longitudinal direction (LA1, LA2) of the weft-thread beat-up device (1),
    wherein the at least one camera apparatus (20) is fastened to the weft-thread beat-up device (1) so that the at least one camera apparatus (20) is co-moved with the weft-thread beat-up device (1) during a movement of the weft-thread beat-up device (1),
    wherein the at least one camera apparatus (20) comprises a plurality of sensor elements arranged adjacent to one another,
    wherein the camera apparatus (20) is configured to record an image by means of the sensor elements and
    wherein the sensor elements are arranged in a row which extends substantially parallel to the longitudinal direction (LA1, LA2) of the weft-thread beat-up device (1).

2. The monitoring device (100, 100a) according to claim 1, wherein
    the weft-thread beat-up device (1) comprises at least one reed (17) and
    the camera apparatus (20) is disposed on a first collar (24a) or on a second collar (24b) of the reed (17).

3. The monitoring device (100, 100a) according to claim 1,
    wherein at least one vibration damping device (28) is disposed between the weft-thread beat-up device (1) and the camera apparatus (20).

4. The monitoring device (100, 100a) according to claim 1,
    having a device (29) for adjusting the position of the at least one camera apparatus (20) relative to the weft-thread beat-up device (1).

5. The monitoring device (100, 100a) according to claim 1,
    having at least one image processing device (BV) for analysis of an image recorded by the camera apparatus (20) in order to detect defects and having a data storage device (SM) which is in data communication with the image processing device (BV), wherein the image processing device (BV) and the data storage device (SM) are mechanically connected to the weft-thread beat-up device (1).

6. The monitoring device (100, 100a) according to claim 1, wherein the camera apparatus (20) is configured to provide image data representing a recorded image, having an image processing device (BV) which is designed to analyze image data provided by the camera apparatus (20) and generate data as a result of an analysis of the image data, having a data transmitting device which is connected mechanically to the weft-thread beat-up device (1) and which is configured to wirelessly transmit at least one of image data provided by the camera apparatus (20) and data generated by the image processing device (BV).

7. The monitoring device (100, 100a) according to claim 1, having a multiplicity of camera apparatuses (20), wherein the plurality of camera apparatuses (20) are disposed consecutively in a row along the longitudinal direction (LA1, LA2) of the weft-thread beat-up device (1) and wherein each camera apparatus (20) has at least one image region (22) and two of the camera apparatuses (20) are disposed adjacent to one another in such a manner that image regions (22) of the two of the camera apparatuses (20) overlap.

8. The monitoring device (100, 100a) according to claim 7, wherein at least two of the camera apparatuses (20) are disposed in a module (M0, ME) with at least one lighting device (39) and the module additionally at least comprises:

at least one of a common image control device (BSE) for triggering the at least two of the camera apparatuses (20) in order to cause the at least two of the camera apparatuses (20) to record images and a common image processing device (BV) for processing the images recorded by the at least two camera apparatuses (20).

9. The monitoring device according to claim 7, wherein the weft-thread beat-up device (1) has a longitudinal section which comprises passages (18a) for the warp threads (4) formed in a reed (17)

and wherein the camera apparatuses (20) are disposed consecutively in such a manner that the entirety of all the image regions (22) of the camera apparatuses (20) extend in a direction parallel to the longitudinal direction (LA1, LA2) of the weft-thread beat-up device (1) over a distance (Ref) which is greater than or equal to the length (B) of the longitudinal section of the weft-thread beat-up device (1).

10. The monitoring device (100, 100a) according to claim 1, wherein in addition one sensor device (BS) for determining an instantaneous position of the weft-thread beat-up device (1) is fastened to the weft-thread beat-up device (1) and the sensor device (BS) is in data communication:

with at least one of an image control device (BSE) for triggering the at least one camera apparatus (20) in order to cause the camera apparatus (20) to record an image and an image processing device (BV) for processing an image recorded by the camera apparatus (20).

11. The monitoring device (100, 100a) according to claim 1, having a synchronizing unit (SE) which is configured to synchronize the camera apparatus (20) with a position (15, 16) of the weft-thread beat-up device (1) in order to control the camera apparatus (20) depending on a position of the weft-thread beat-up device (1).

12. A weaving machine (2) having a monitoring device (100, 100a) according to claim 1 and at least one control device (KW) for triggering at least one component of the weaving machine (2), wherein the control device (KW) is configured to receive data directly or indirectly from the camera apparatus (20).

13. A method for monitoring at least warp threads (4) in a weaving machine (2) having at least one camera apparatus (20), which weaving machine (2) comprises a movable weft-thread beat-up device (1) which during a movement from a back position (15) into a beat-up position (16) during a weaving process conveys a weft thread (5) into a position extending substantially parallel to a longitudinal direction (LA1, LA2) of the weft-thread beat-up device (1), wherein the camera apparatus (20) is co-moved with the weft-thread beat-up device (1) during the movement of the weft-thread beat-up device (1) and the camera apparatus (20) records an image at at least a specific position (15, 16) of the weft-thread beat-up device (1) during a weaving process.

14. The method according to claim 13, wherein an image processing (BV) of at least one image recorded by the camera apparatus (20) is carried out in order to detect a defect for at least one of the warp threads (4) and localize the defect along a direction which runs at least partially parallel to the longitudinal direction (LA1, LA2) of the weft-thread beat-up device (1).

15. The method according to claim 14, wherein the camera apparatus (20) records each image in the form of a multiplicity of adjacently disposed pixels, an assignment of the warp threads (4) is performed for the weaving process in which, to each warp thread (4) to be monitored, at least one of the pixels is assigned, and the defect is localized with the aid of the assignment.

16. The method according to claim 14, wherein if a defect is detected by means of the image processing (BV), a device disposed on the weft-thread beat-up device (1), preferably a lighting device (39) is triggered so that the device visibly displays the position of the defect.

17. The method according to claim 13, wherein warp thread defects and in addition at least one of weft thread defects and weaving defects are monitored.

* * * * *